US012693856B2

(12) United States Patent
Raubenheimer et al.

(10) Patent No.: US 12,693,856 B2
(45) Date of Patent: Jul. 28, 2026

(54) APPARATUS, METHOD, AND COMPUTER PROGRAM PRODUCT FOR OUTPUTTING A SOFTWARE DEVELOPMENT NETWORK ENVIRONMENT ESCALATE ACTION AGGREGATION INTERFACE COMPONENT TO A SOFTWARE DEVELOPMENT NETWORK ENVIRONMENT OPERATIONS ACTION INTERFACE

(71) Applicant: ATLASSIAN PTY LTD., Sydney (AU)

(72) Inventors: Gabriel David Tonin Raubenheimer, Sydney (AU); Andrea Leanne Olrich, Sydney (AU); Lauren Jessica Bradley, Sydney (AU); Shiveen Pandita, Melbourne (AU); Julia Wai-Yan Wong, Sydney (AU); Bradley Jay Schoone, Perth (AU); Christopher Charles Mann, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 293 days.

(21) Appl. No.: 18/397,388

(22) Filed: Dec. 27, 2023

(65) Prior Publication Data
US 2025/0217138 A1 Jul. 3, 2025

(51) Int. Cl.
*G06F 9/44* (2018.01)
*G06F 8/77* (2018.01)
(52) U.S. Cl.
CPC ...................................... *G06F 8/77* (2013.01)

(58) Field of Classification Search
CPC .................................... G06F 8/77; G06F 8/20
See application file for complete search history.

(56) References Cited

U.S. PATENT DOCUMENTS

2005/0132324 A1* 6/2005 Guyette .................... G06F 8/20
717/101
2012/0102402 A1* 4/2012 Kwong ................... G06F 9/453
715/705
(Continued)

*Primary Examiner* — Qamrun Nahar
(74) *Attorney, Agent, or Firm* — Alston & Bird LLP

(57) ABSTRACT

Apparatus, methods, and computer program products for outputting a software development network environment escalate action aggregation interface component to a software development network environment operations action interface in a network environment operation and escalation system are provided. A method may include accessing non-software development network environment escalate action data, determining a non-software development network environment escalate action characteristic set based at least in part on the non-software development network environment escalate action data, the non-software development network environment escalate action characteristic set indicative of at least one non-software development network environment escalate action item, generating a software development network environment escalate action aggregation interface component comprising the non-software development network environment escalate action item, and outputting the software development network environment escalate action aggregation interface component for rendering to a software development network environment operations action interface of a computing device.

18 Claims, 12 Drawing Sheets

(56)                    References Cited

U.S. PATENT DOCUMENTS

| | | | |
|---|---|---|---|
| 2017/0031536 A1* | 2/2017 | Shah .................... | G06Q 50/01 |
| 2023/0069002 A1* | 3/2023 | Sroka ................... | G06N 20/00 |

* cited by examiner

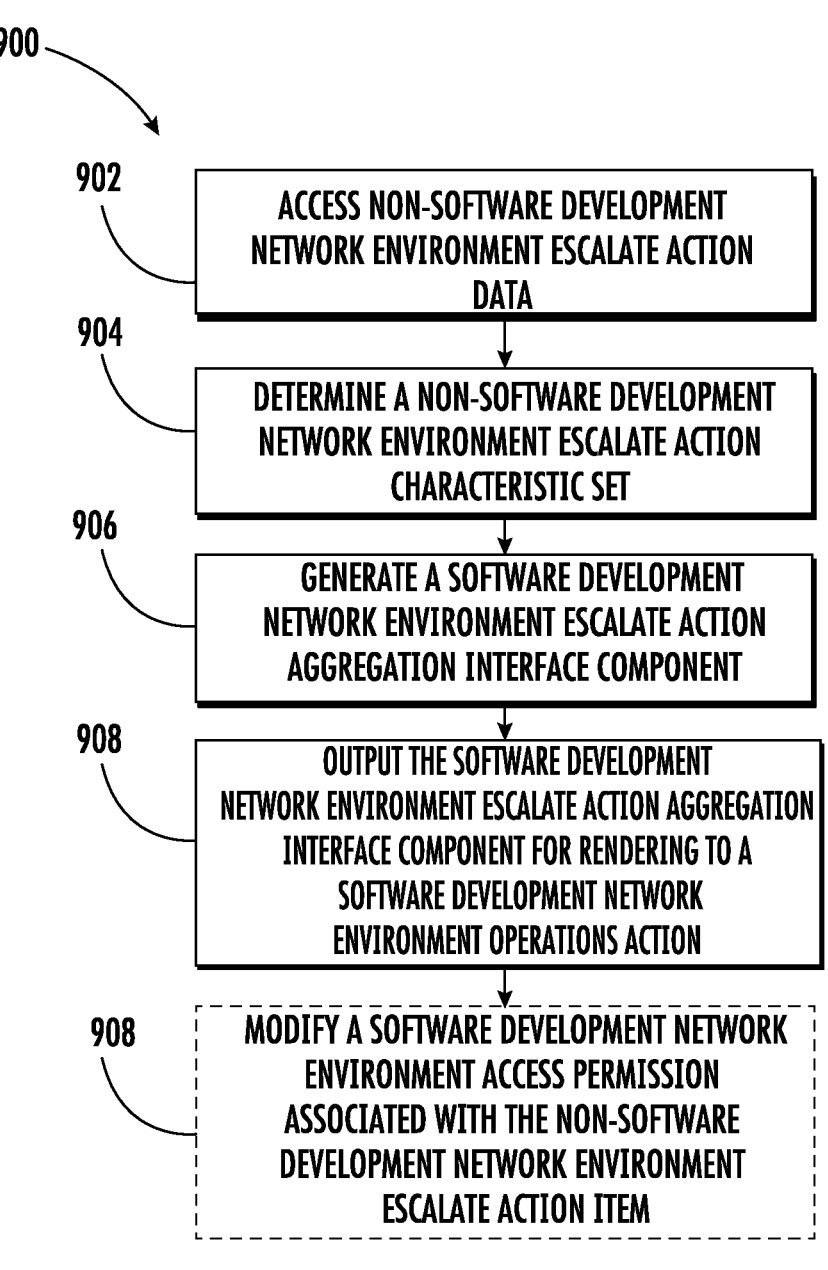

900

902 ACCESS NON-SOFTWARE DEVELOPMENT NETWORK ENVIRONMENT ESCALATE ACTION DATA

904 DETERMINE A NON-SOFTWARE DEVELOPMENT NETWORK ENVIRONMENT ESCALATE ACTION CHARACTERISTIC SET

906 GENERATE A SOFTWARE DEVELOPMENT NETWORK ENVIRONMENT ESCALATE ACTION AGGREGATION INTERFACE COMPONENT

908 OUTPUT THE SOFTWARE DEVELOPMENT NETWORK ENVIRONMENT ESCALATE ACTION AGGREGATION INTERFACE COMPONENT FOR RENDERING TO A SOFTWARE DEVELOPMENT NETWORK ENVIRONMENT OPERATIONS ACTION

908 MODIFY A SOFTWARE DEVELOPMENT NETWORK ENVIRONMENT ACCESS PERMISSION ASSOCIATED WITH THE NON-SOFTWARE DEVELOPMENT NETWORK ENVIRONMENT ESCALATE ACTION ITEM

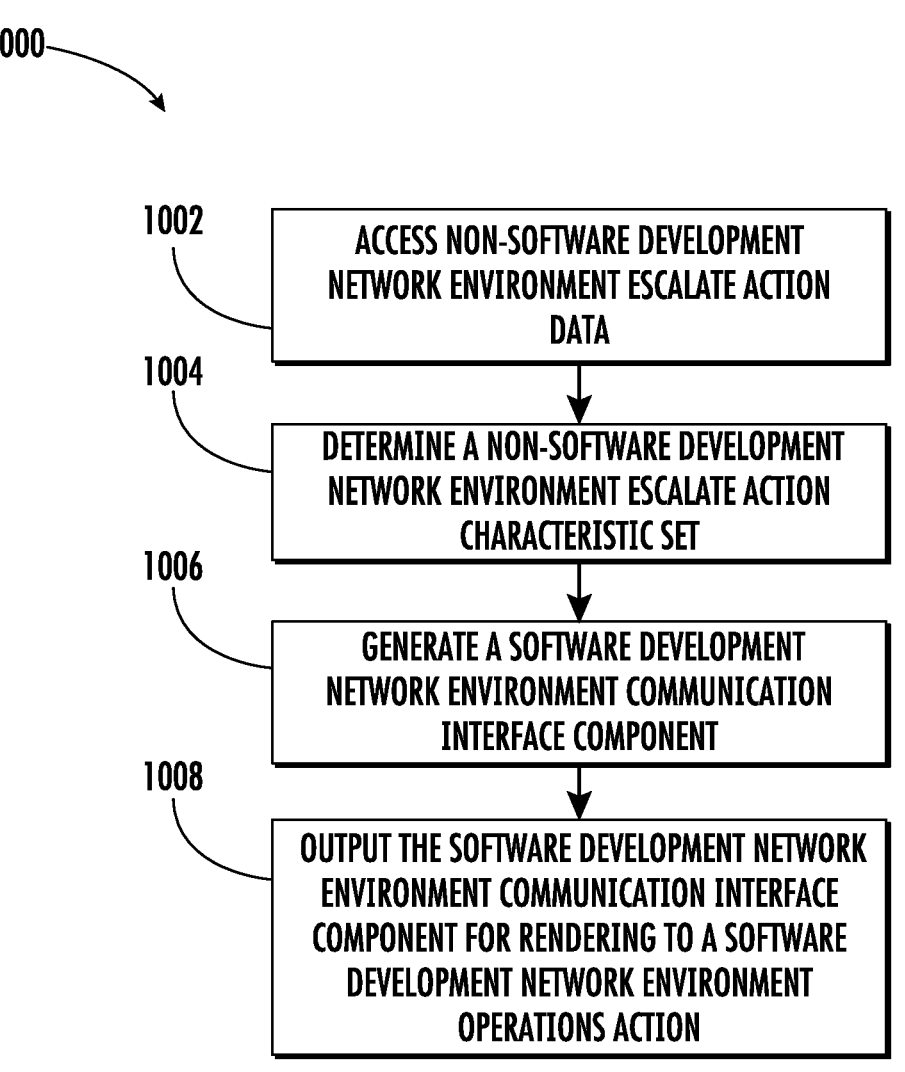

1002
ACCESS NON-SOFTWARE DEVELOPMENT NETWORK ENVIRONMENT ESCALATE ACTION DATA

1004
DETERMINE A NON-SOFTWARE DEVELOPMENT NETWORK ENVIRONMENT ESCALATE ACTION CHARACTERISTIC SET

1006
GENERATE A SOFTWARE DEVELOPMENT NETWORK ENVIRONMENT COMMUNICATION INTERFACE COMPONENT

1008
OUTPUT THE SOFTWARE DEVELOPMENT NETWORK ENVIRONMENT COMMUNICATION INTERFACE COMPONENT FOR RENDERING TO A SOFTWARE DEVELOPMENT NETWORK ENVIRONMENT OPERATIONS ACTION

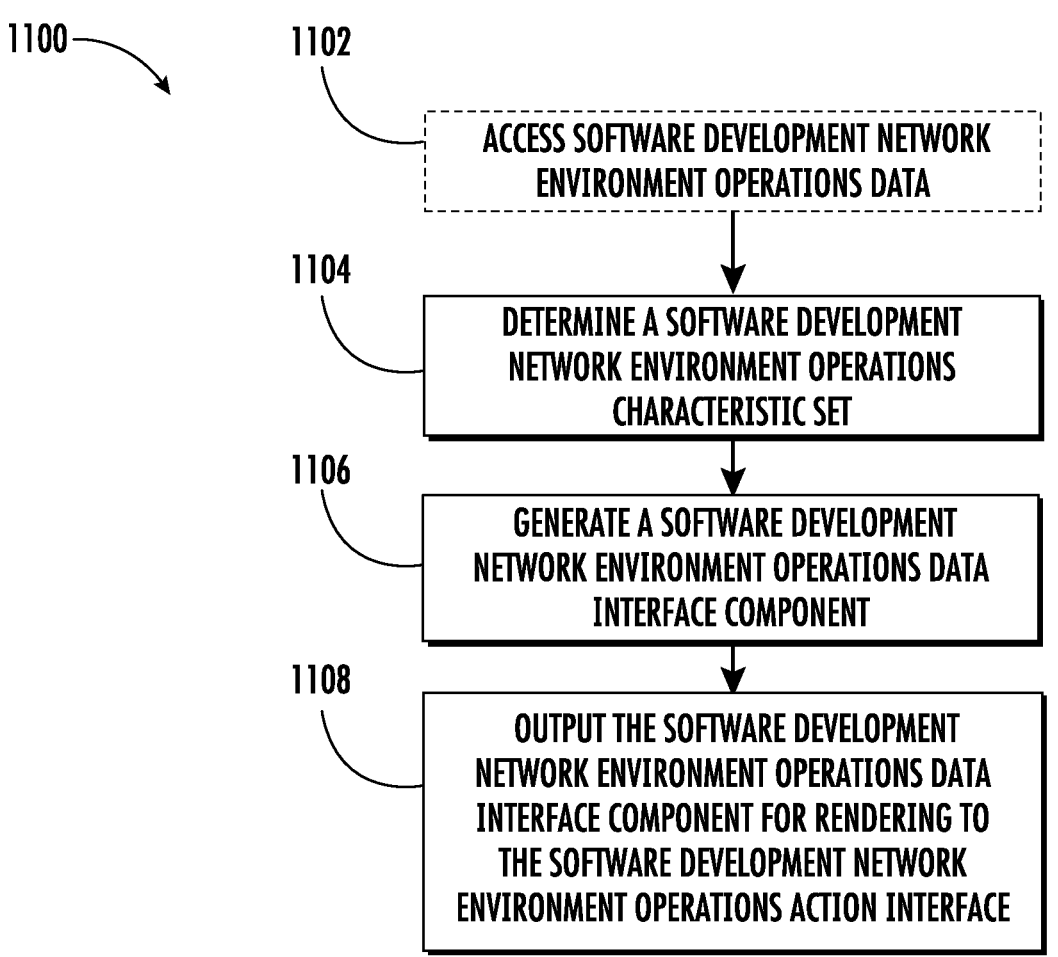

ACCESS SOFTWARE DEVELOPMENT NETWORK ENVIRONMENT OPERATIONS DATA

1104

DETERMINE A SOFTWARE DEVELOPMENT NETWORK ENVIRONMENT OPERATIONS CHARACTERISTIC SET

1106

GENERATE A SOFTWARE DEVELOPMENT NETWORK ENVIRONMENT OPERATIONS DATA INTERFACE COMPONENT

1108

OUTPUT THE SOFTWARE DEVELOPMENT NETWORK ENVIRONMENT OPERATIONS DATA INTERFACE COMPONENT FOR RENDERING TO THE SOFTWARE DEVELOPMENT NETWORK ENVIRONMENT OPERATIONS ACTION INTERFACE

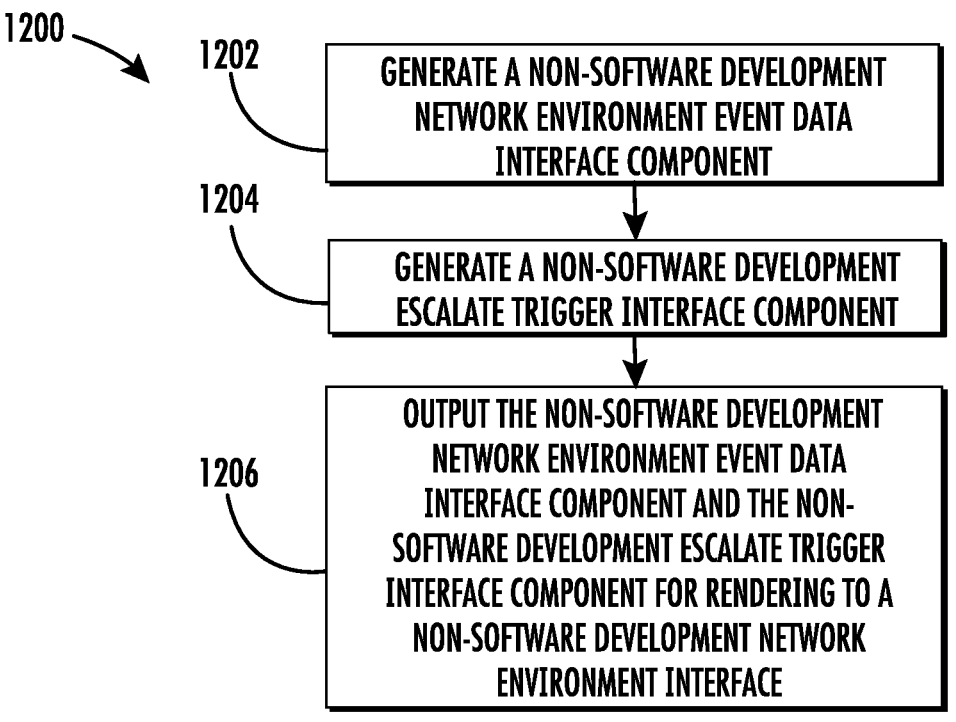

1202

GENERATE A NON-SOFTWARE DEVELOPMENT NETWORK ENVIRONMENT EVENT DATA INTERFACE COMPONENT

1204

GENERATE A NON-SOFTWARE DEVELOPMENT ESCALATE TRIGGER INTERFACE COMPONENT

1206

OUTPUT THE NON-SOFTWARE DEVELOPMENT NETWORK ENVIRONMENT EVENT DATA INTERFACE COMPONENT AND THE NON-SOFTWARE DEVELOPMENT ESCALATE TRIGGER INTERFACE COMPONENT FOR RENDERING TO A NON-SOFTWARE DEVELOPMENT NETWORK ENVIRONMENT INTERFACE

FIG. 12

APPARATUS, METHOD, AND COMPUTER PROGRAM PRODUCT FOR OUTPUTTING A SOFTWARE DEVELOPMENT NETWORK ENVIRONMENT ESCALATE ACTION AGGREGATION INTERFACE COMPONENT TO A SOFTWARE DEVELOPMENT NETWORK ENVIRONMENT OPERATIONS ACTION INTERFACE

BACKGROUND

Various methods, apparatuses, and systems provide tools for plan, collaborate, execute, address, resolve and monitor items and interface components in network environments. Applicant has identified a number of deficiencies and problems associated with tools for effectively, reliably, and securely managing items and interface components in a network environment operation and escalation system. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include improved methods, apparatuses, computer program products, and/or the like that are configured for effectively and efficiently outputting, in a network environment operation and escalation system, a software development network environment escalate action aggregation interface component to a software development network environment operations action interface, in real-time or near real-time.

In accordance with some exemplary embodiments of the present disclosure, an example apparatus is provided for outputting a software development network environment escalate action aggregation interface component to a software development network environment operations action interface. In some embodiments, the apparatus may comprise at least one processor and at least one memory including program code. In some embodiments, the at least one memory and the program code are configured to, with the at least one processor, cause the apparatus to access non-software development network environment escalate action data. In some embodiments, the at least one memory and the program code are configured to, with the at least one processor, cause the apparatus to determine a non-software development network environment escalate action characteristic set based at least in part on the non-software development network environment escalate action data, the non-software development network environment escalate action characteristic set indicative of at least one non-software development network environment escalate action item. In some embodiments, the at least one memory and the program code are configured to, with the at least one processor, cause the apparatus to generate a software development network environment escalate action aggregation interface component comprising the non-software development network environment escalate action item. In some embodiments, the at least one memory and the program code are configured to, with the at least one processor, cause the apparatus to output the software development network environment escalate action aggregation interface component for rendering to a software development network environment operations action interface of a computing device associated with the software development network environment escalate action aggregation interface component.

In some embodiments, the at least one memory and the program code are configured to, with the at least one processor, cause the apparatus to access software development network environment operations data. In some embodiments, the at least one memory and the program code are configured to, with the at least one processor, cause the apparatus to determine a software development network environment operations characteristic set based at least in part on the software development network environment operations data, the software development network environment operations characteristic set indicative of at least one software development network environment operations item. In some embodiments, the at least one memory and the program code are configured to, with the at least one processor, cause the apparatus to generate a software development network environment operations data interface component comprising the software development network environment operations item. In some embodiments, the at least one memory and the program code are configured to, with the at least one processor, cause the apparatus to output the software development network environment operations data interface component for rendering to the software development network environment operations action interface of the computing device.

In some embodiments, the software development network environment escalate action aggregation interface component is rendered proximate the software development network environment operations data interface component on the software development network environment operations action interface of the computing device.

In some embodiments, determining the non-software development network environment escalate action characteristic set is based at least in part on an escalate action characteristic model.

In some embodiments, the escalate action characteristic model is a trained machine learning model.

In some embodiments, the escalate action characteristic model is trained using historical non-software development network environment escalate action characteristic sets.

In some embodiments, the non-software development network environment escalate action characteristic set comprises one or more of a key identifier, an item nature indication, a component identifier, a service identifier, a network environment user identifier, or an action status.

In some embodiments, the at least one memory and the program code are configured to, with the at least one processor, cause the apparatus to modify a software development network environment access permission associated with the non-software development network environment escalate action item.

In some embodiments, modifying the software development network environment access permission is based at least in part on a non-software development network environment escalate trigger event.

In some embodiments, the at least one memory and the program code are configured to, with the at least one processor, cause the apparatus to generate a non-software development network environment event data interface component based at least in part on a portion of the non-software development network environment escalate action data. In some embodiments, the at least one memory and the program code are configured to, with the at least one processor, cause the apparatus to generate a non-software development network environment escalate trigger interface component configured to capture the non-software development network environment escalate trigger event. In some embodiments, the at least one memory and the program code are configured to, with the at least one processor, cause the apparatus to output the non-software development network environment event data interface component and the non-software development network environment escalate trigger interface component for rendering to a non-software development network environment interface of a computing device associated with the non-software development network environment escalate trigger interface component.

In accordance with another exemplary embodiment of the present disclosure, a method is provided for outputting a software development network environment escalate action aggregation interface component to a software development network environment operations action interface. In some embodiments, the method includes accessing non-software development network environment escalate action data. In some embodiments, the method includes determining a non-software development network environment escalate action characteristic set based at least in part on the non-software development network environment escalate action data, the non-software development network environment escalate action characteristic set indicative of at least one non-software development network environment escalate action item. In some embodiments, the method includes generating a software development network environment escalate action aggregation interface component comprising the non-software development network environment escalate action item. In some embodiments, the method includes outputting the software development network environment escalate action aggregation interface component for rendering to a software development network environment operations action interface of a computing device associated with the software development network environment escalate action aggregation interface component.

In some embodiments, the method includes accessing software development network environment operations data. In some embodiments, the method includes determining a software development network environment operations characteristic set based at least in part on the software development network environment operations data, the software development network environment operations characteristic set indicative of at least one software development network environment operations item. In some embodiments, the method includes generating a software development network environment operations data interface component comprising the software development network environment operations item. In some embodiments, the method includes outputting the software development network environment operations data interface component for rendering to the software development network environment operations action interface of the computing device.

In some embodiments, the software development network environment escalate action aggregation interface component is rendered proximate the software development network environment operations data interface component on the software development network environment operations action interface of the computing device.

In some embodiments, determining the non-software development network environment escalate action characteristic set is based at least in part on an escalate action characteristic model.

In some embodiments, the escalate action characteristic model is a trained machine learning model.

In some embodiments, the escalate action characteristic model is trained using historical non-software development network environment escalate action characteristic sets.

In some embodiments, the non-software development network environment escalate action characteristic set comprises one or more of a key identifier, an item nature indication, a component identifier, a service identifier, a network environment user identifier, or an action status.

In some embodiments, the method includes modifying a software development network environment access permission associated with the non-software development network environment escalate action item.

In some embodiments, modifying the software development network environment access permission is based at least in part on a non-software development network environment escalate trigger event.

In some embodiments, the method includes generating a non-software development network environment event data interface component based at least in part on a portion of the non-software development network environment escalate action data. In some embodiments, the method includes generating a non-software development network environment escalate trigger interface component configured to capture the non-software development network environment escalate trigger event. In some embodiments, the method includes outputting the non-software development network environment event data interface component and the non-software development network environment escalate trigger interface component for rendering to a non-software development network environment interface of a computing device associated with the non-software development network environment escalate trigger interface component.

In accordance with another exemplary embodiment of the present disclosure, a computer program product for outputting a software development network environment escalate action aggregation interface component to a software development network environment operations action interface. In some embodiments, the computer program product comprises at least one non-transitory computer-readable storage medium having computer-readable program code portions stored therein, the computer-readable program code portions comprising an executable portion. In some embodiments, the computer-readable program code portions comprising an executable portion are configured to access non-software development network environment escalate action data. In some embodiments, the computer-readable program code portions comprising an executable portion are configured to determine a non-software development network environment escalate action characteristic set based at least in part on the non-software development network environment escalate action data, the non-software development network environment escalate action characteristic set indicative of at least one non-software development network environment escalate action item. In some embodiments, the computer-readable program code portions comprising an executable portion are configured to generate a software development network environment escalate action aggregation interface component comprising the non-software development network environment escalate action item. In some embodiments, the computer-readable program code portions comprising an executable portion are configured to output the software development network environment escalate action aggregation interface component for rendering to a software development network environment operations action interface of a computing device associated with the software development network environment escalate action aggregation interface component.

In some embodiments, the computer-readable program code portions comprising an executable portion are configured to access software development network environment operations data. In some embodiments, the computer-readable program code portions comprising an executable portion are configured to determine a software development network environment operations characteristic set based at least in part on the software development network environment operations data, the software development network environment operations characteristic set indicative of at least one software development network environment operations item. In some embodiments, the computer-readable program code portions comprising an executable portion are configured to generate a software development network environment operations data interface component comprising the software development network environment operations item. In some embodiments, the computer-readable program code portions comprising an executable portion are configured to output the software development network environment operations data interface component for rendering to the software development network environment operations action interface of the computing device.

In some embodiments, the software development network environment escalate action aggregation interface component is rendered proximate the software development network environment operations data interface component on the software development network environment operations action interface of the computing device.

In some embodiments, determining the non-software development network environment escalate action characteristic set is based at least in part on an escalate action characteristic model.

In some embodiments, the escalate action characteristic model is a trained machine learning model.

In some embodiments, the escalate action characteristic model is trained using historical non-software development network environment escalate action characteristic sets.

In some embodiments, the non-software development network environment escalate action characteristic set comprises one or more of a key identifier, an item nature indication, a component identifier, a service identifier, a network environment user identifier, or an action status.

In some embodiments, the computer-readable program code portions comprising an executable portion are configured to modify a software development network environment access permission associated with the non-software development network environment escalate action item.

In some embodiments, modifying the software development network environment access permission is based at least in part on a non-software development network environment escalate trigger event.

In some embodiments, the computer-readable program code portions comprising an executable portion are configured to generate a non-software development network environment event data interface component based at least in part on a portion of the non-software development network environment escalate action data. In some embodiments, the computer-readable program code portions comprising an executable portion are configured to generate a non-software development network environment escalate trigger interface component configured to capture the non-software development network environment escalate trigger event. In some embodiments, the computer-readable program code portions comprising an executable portion are configured to output the non-software development network environment event data interface component and the non-software development network environment escalate trigger interface component for rendering to a non-software development network environment interface of a computing device associated with the non-software development network environment escalate trigger interface component.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the figures in accordance with an example embodiment of the present disclosure.

Figure 1:
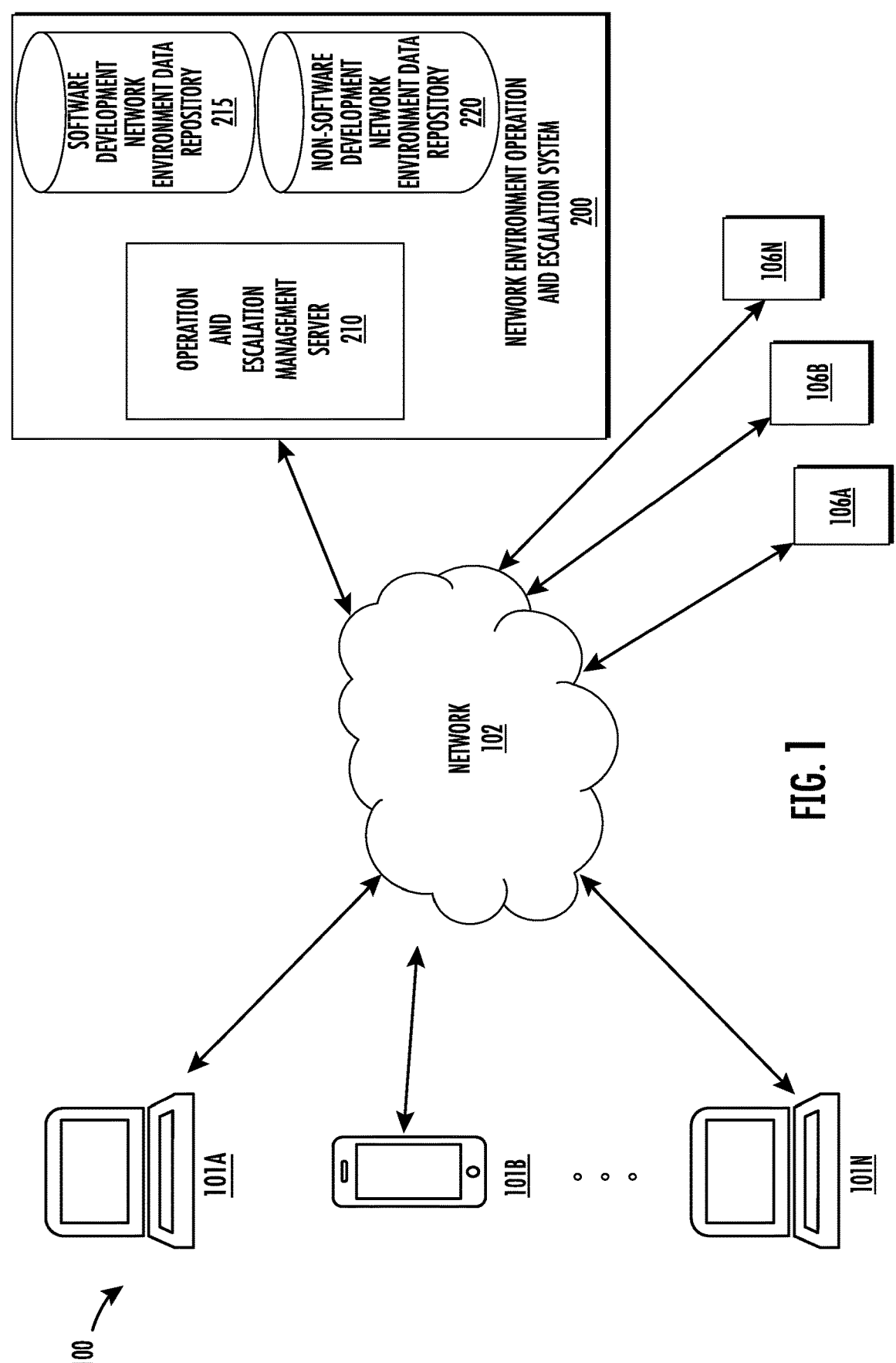
Figure 2:
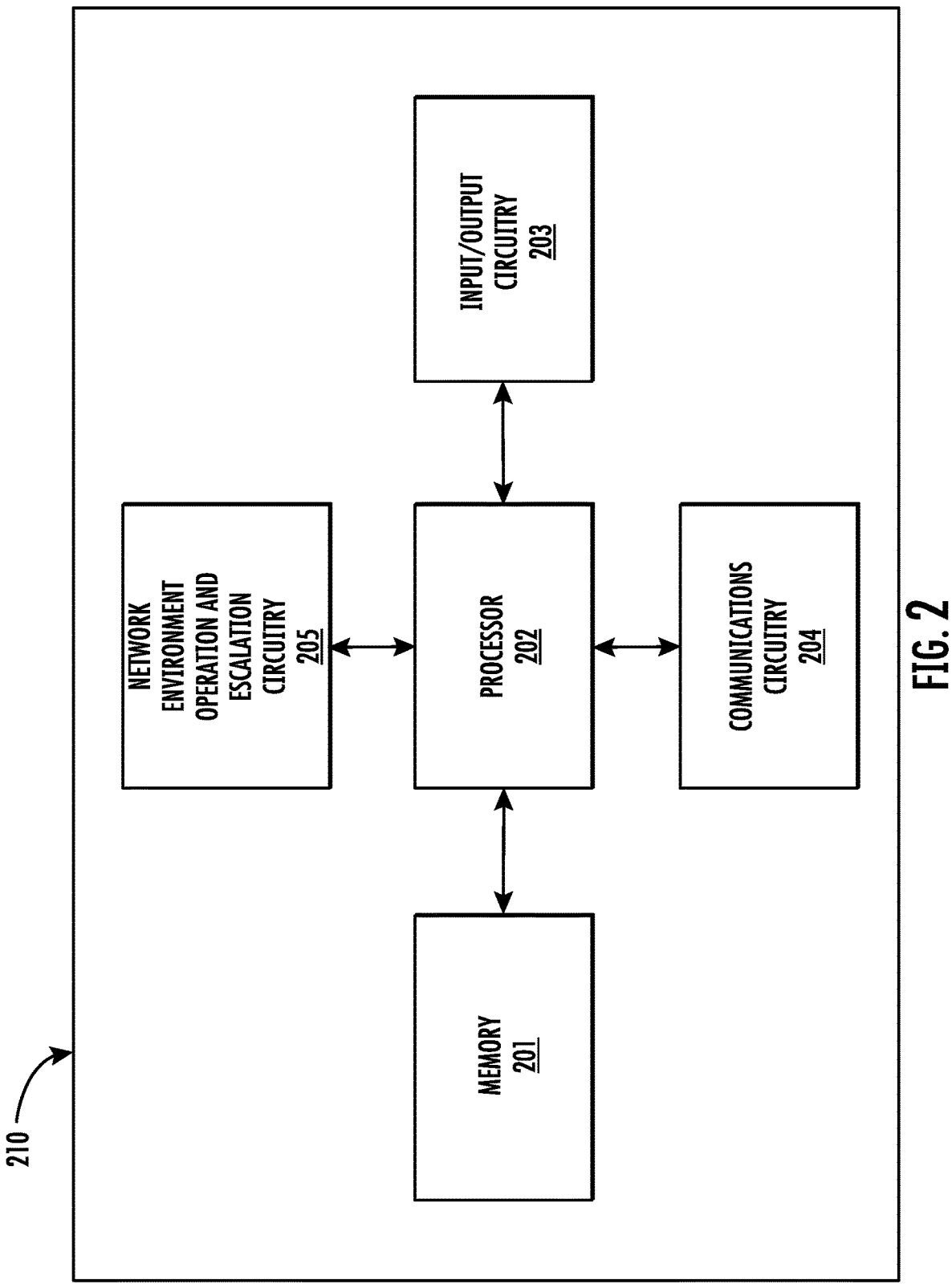
Figure 3:
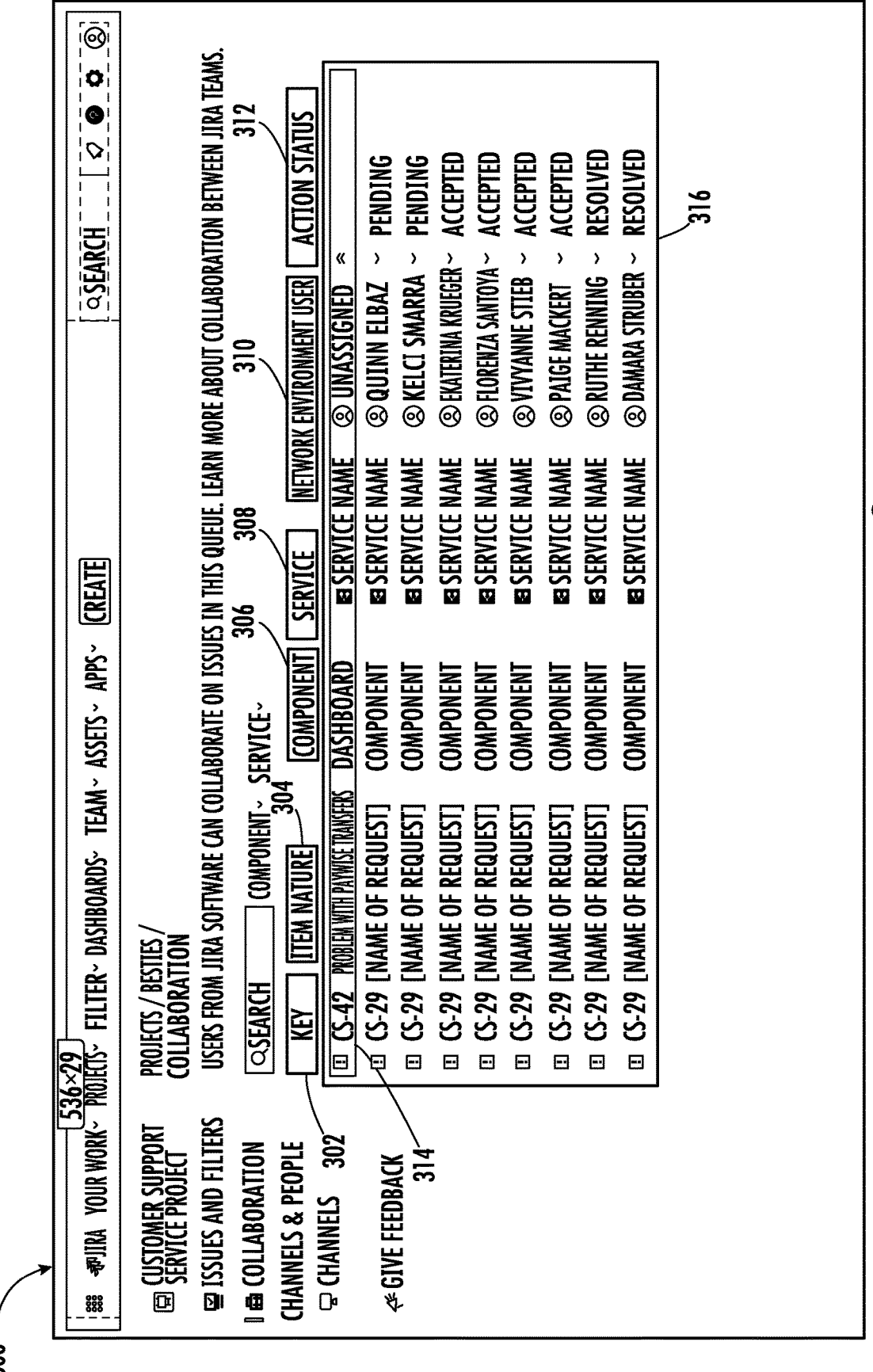
Figure 4:
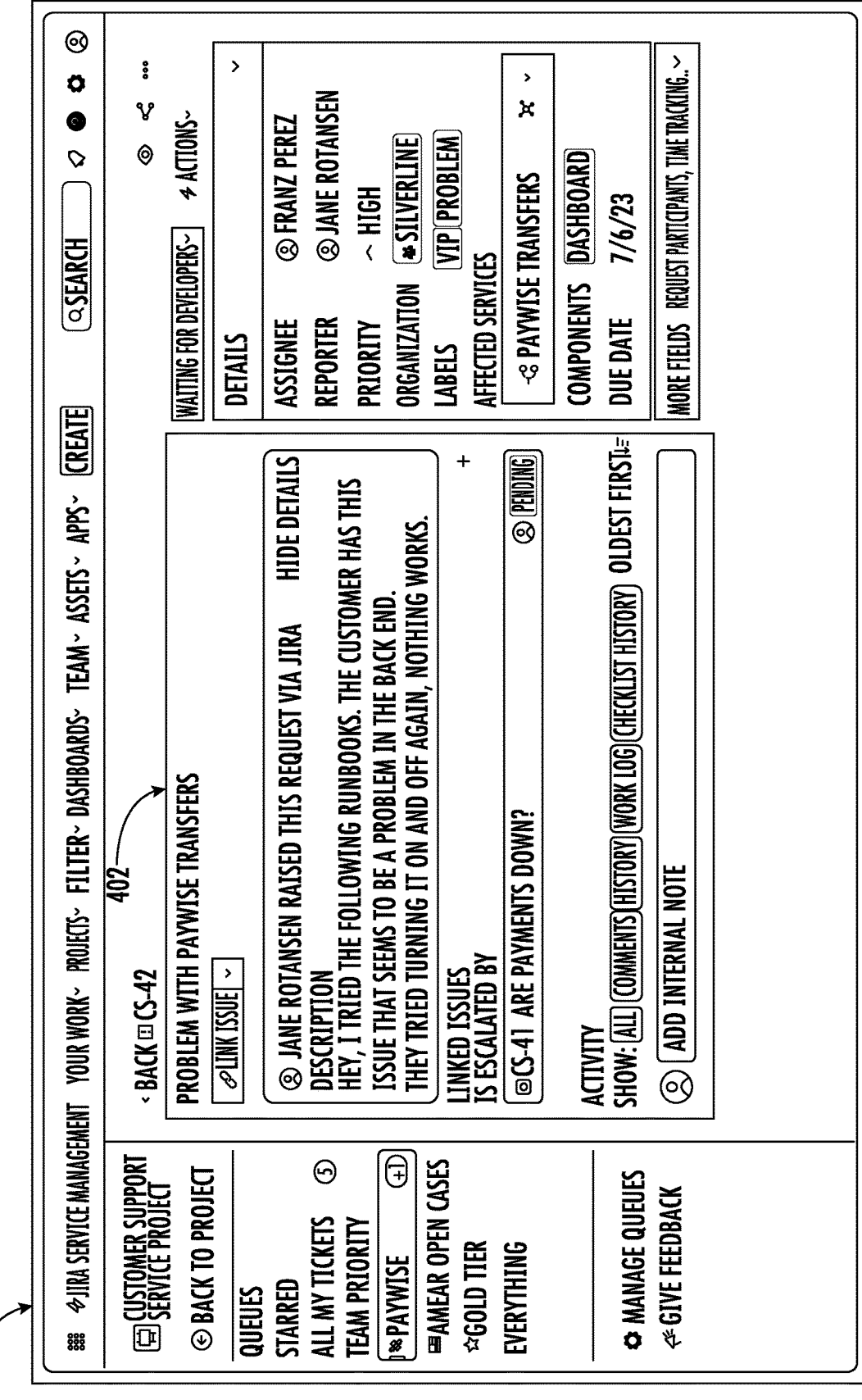
Figure 5:
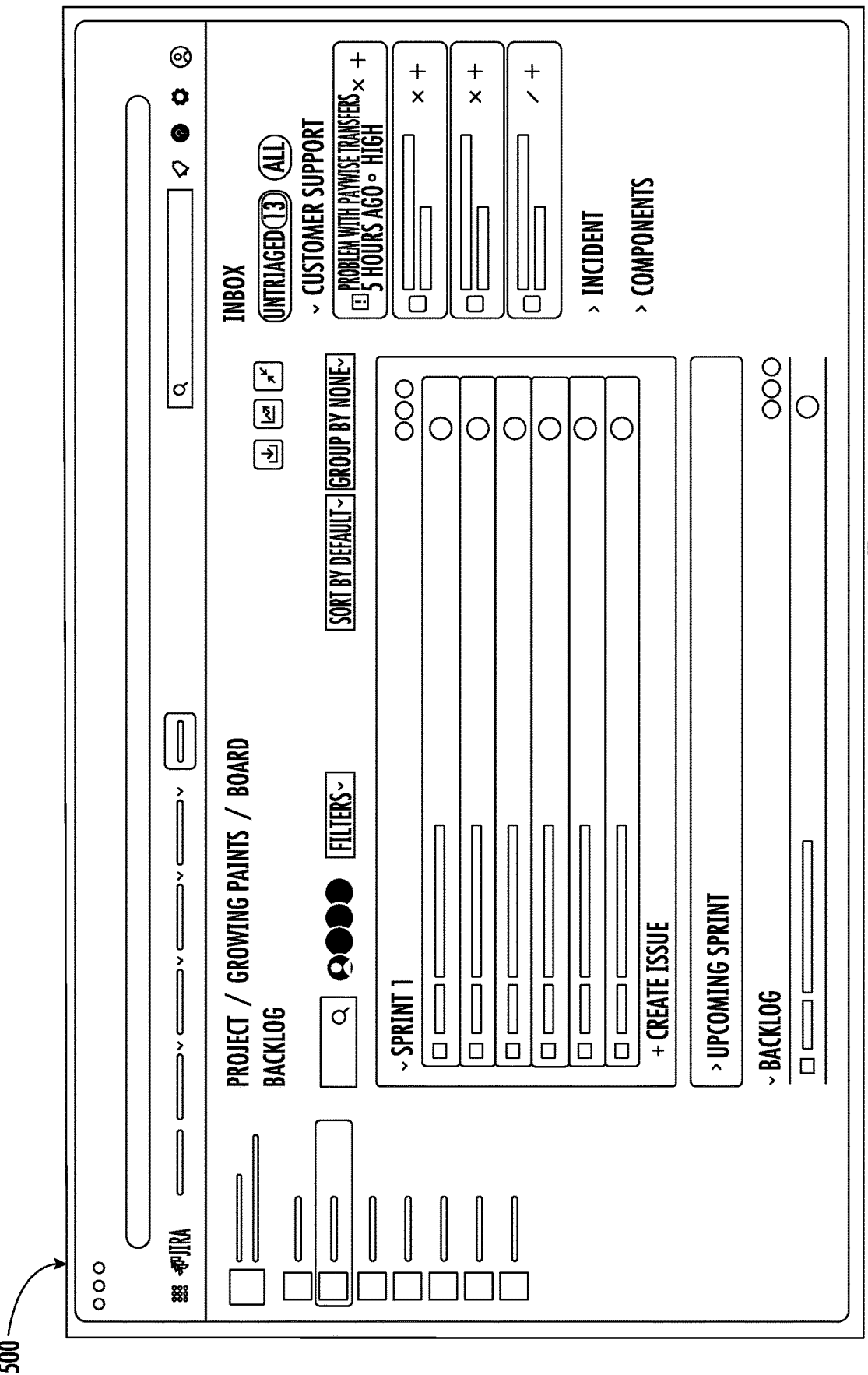
Figure 6:
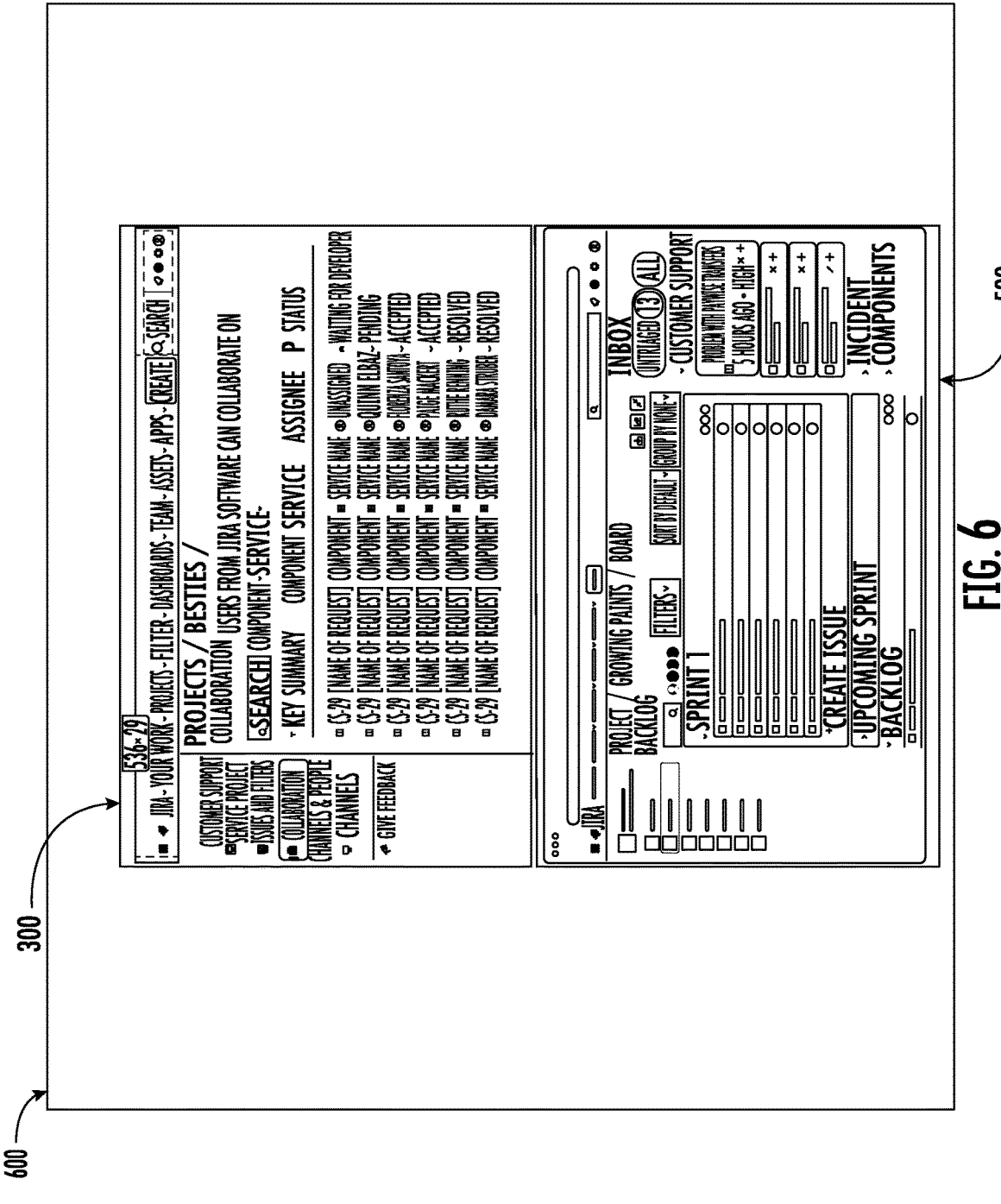
Figure 7:
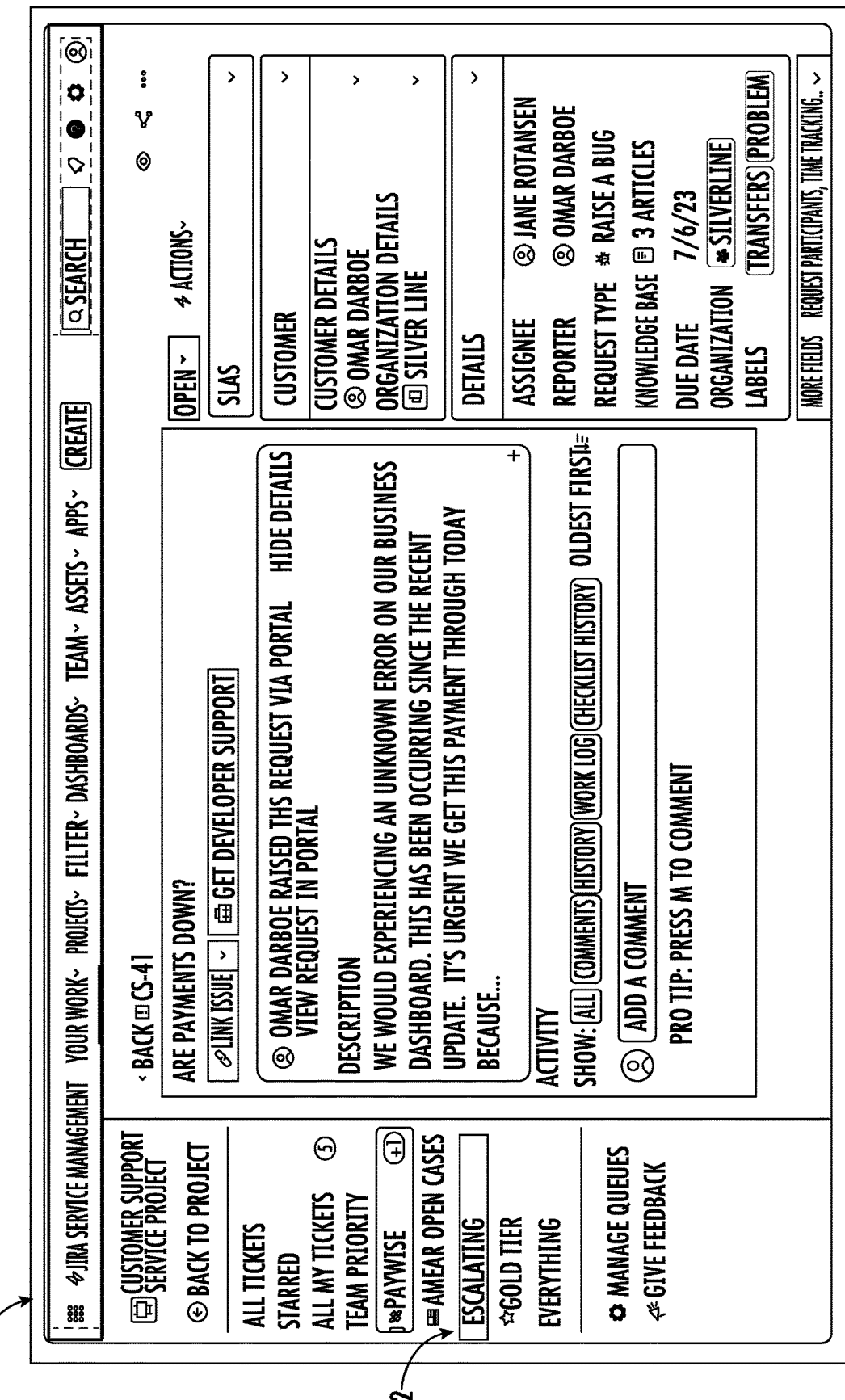
Figure 8:
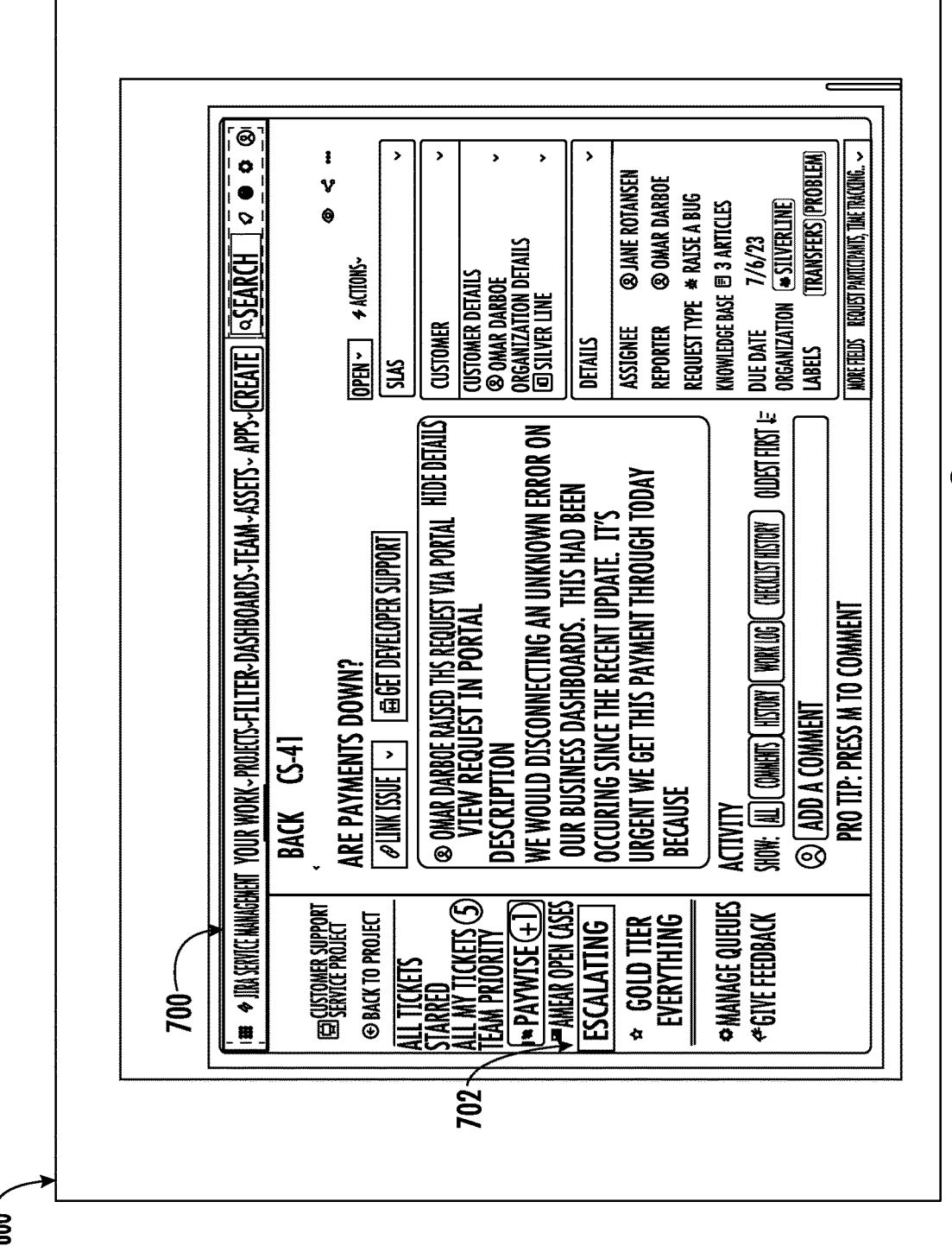

FIG. 1 illustrates an example network environment operation and escalation system configured to communicate with various client devices in accordance with various example embodiments of the present disclosure;

FIG. 2 depicts a schematic block diagram of example circuitry to perform various operations in accordance with various example embodiments of the present disclosure;

FIG. 3 illustrates an example software development network environment escalate action aggregation interface component in accordance with various example embodiments of the present disclosure;

FIG. 4 illustrates an example software development network environment escalate action communication interface component in accordance with various example embodiments of the present disclosure;

FIG. 5 illustrates an example software development network environment operations data interface component in accordance with various example embodiments of the present disclosure;

FIG. 6 illustrates an example software development network environment operations action interface in accordance with various example embodiments of the present disclosure;

FIG. 7 illustrates an example non-software development network environment event data interface component in accordance with various example embodiments of the present disclosure;

FIG. 8 illustrates an example non-software development network environment interface in accordance with various example embodiments of the present disclosure;

FIG. 9 depicts a flowchart diagram illustrating example operations for outputting software development network environment escalate action aggregation interface component in accordance with an example embodiment of the present disclosure;

FIG. 10 depicts a flowchart diagram illustrating example operations for outputting a software development network environment communication interface component in accordance with an example embodiment of the present disclosure;

FIG. 11 depicts a flowchart diagram illustrating example operations for outputting a software development network environment operations data interface component in accordance with an example embodiment of the present disclosure; and FIG. 12 depicts a flowchart diagram illustrating example operations for outputting a non-software development network environment event data interface component and a non-software development network environment escalate trigger interface component in accordance with an example embodiment of the present disclosure.

DETAILED DESCRIPTION

Example embodiments now will be more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details. It should be understood that some, but not all embodiments of the present disclosure are shown and described herein. Indeed, embodiments of the disclosure may be embodied in many different forms, and accordingly this disclosure should not be construed as limited to the embodiments set forth herein; rather, these embodiments are provided so that this disclosure will satisfy applicable legal requirements.

Overview

Methods, apparatuses, systems, and computer program products are provided in accordance with example embodiments of the present disclosure in order to address technical problems associated with enabling efficient, reliable, and secure generation and provisioning of various interface components, such as a software development network environment escalate action aggregation interface component, and/or items, such as a non-software development network environment escalate action item. This reduces computational load, provides a low latency user experience, and ensures secure access control of sensitive information.

A network environment operation and escalation system (e.g., Jira® by Atlassian) enables software development network environment users and/or non-software development network environment users to plan, track, organize, schedule, address, repair, diagnosis, execute, monitor, and/or otherwise manage complex and cross functional network environment items, such as software development network environment escalate action items and non-software development network environment escalate action items. In such an agile operation and escalation network environment, it is desirable for software development network environment users and non-software development network environment users to be able to operate collaboratively on such complex and cross functional network environment items. However, due to the increasing complexity of many operation and escalation network environments it has become increasingly difficult for software development network environment users and non-software development network environment users to operate collaboratively in an efficient, reliable, interoperable, and secure manner.

In some example operation and escalation network environments, a software development network environment user is unable to view and interact with an aggregated list of non-software development network environment escalate action items that are associated with the software development network environment user, which decreases efficiency and interoperability. In some example operation and escalation network environments, a software development network environment user is reliant on non-software development network environment users to share information related to non-software development network environment escalate action items associated with the software development network environment user. As a result, software development network environment users often receive piecemeal information about non-software development network environment escalate action items associated with the software development network environment user in an untimely manner, which decreases reliability. In some example operation and escalation network environments, there is no secure and dedicated channel for non-software development network environment users to provide information related to non-software development network environment escalate action items to software development network environment users.

In some examples, a non-software development network environment user may identify non-software development network environment escalate action items that require analysis, diagnosis, repair, and/or resolution by a software development network environment user. However, in many operation and escalation network environments, non-software development network environment users have no particular means to escalate these non-software development network environment escalate action items to software development network environment users and software development network environment users have no means to track all non-software development network environment escalate action items requiring analysis, diagnosis, repair, and/or resolution by the software development network environment user. As a result, non-software development network environment users must escalate these non-software development network environment escalate action items to software development network environment users using non-dedicated and unsecure channels in a piecemeal manner, which may be time consuming, unreliable, resource intensive, and unsecure. Additionally, a software development network environment user may be responsible for analyzing, diagnosing, repairing, and/or resolving numerous unrelated and/or interrelated non-software development network environment escalate action items.

In order to address these technical challenges, the inventors have determined that it is desirable to generate a non-software development network environment escalate trigger interface component that enables non-software development network environment users to escalate non-software development network environment escalate action items to software development network environment users. Additionally, the inventors have determined that it is desirable to generate a software development network environment escalate action aggregation interface component that enables software development network environment users to view all non-software development network environment escalate action items associated with the software development network environment user such that the software development network environment user may analyze, diagnosis, repair, and/or resolve the non-software development network environment escalate action items.

In some examples, a non-software development network environment escalate action item may be related to a software development network environment escalate action item. As such, to analyze, diagnosis, repair, and/or resolve a non-software development network environment escalate action item, a software development network environment user may require access to one or more software development network environment escalate action items while the software development network environment user is addressing the non-software development network environment escalate action item. In this regard, the inventors have determined that it is desirable to generate a software development network environment operations data interface component. A software development network environment operations data interface component may be displayed proximate a software development network environment escalate action aggregation interface component on a software development network environment operations action interface. Thus, enabling a software development network environment user to analyze, diagnosis, repair, and/or resolve a non-software development network environment escalate action item in an efficient, reliable, interoperable, and secure manner.

In some examples, it may not be readily apparent that a non-software development network environment escalate action item requires analysis, diagnosis, repair, and/or resolution by a software development network environment user. As such, the inventors have determined that it is desirable to generate and/or implement an escalate action characteristic model configured to determine a non-software development network environment escalate action characteristic set associated with a non-software development network environment escalate action item. Said differently, an escalate action characteristic model may be configured to determine that a non-software development network environment escalate action item requires analysis, diagnosis, repair, and/or resolution by a software development network environment user. In some examples, a escalate action characteristic model may be a trained machine learning model. That is, an escalate action characteristic model may use trained machine learning algorithms to determine that a non-software development network environment escalate action item requires analysis, diagnosis, repair, and/or resolution by a software development network environment user. These characteristics as well as additional features, functions, and details are described below. Similarly, corresponding and additional embodiments are also described below.

Definitions

The following explanations of terms are provided to better describe the present disclosure and to guide those of ordinary skill in the art in the practice of the present disclosure.

As used herein, the term "network environment operation and escalation system" refers to the software platform(s) and associated hardware configured to support and maintain a plurality of projects, workflows, and all associated functionality. For example, a network environment operation and escalation system may comprise a software product such as Jira® by Atlassian®. Example network environment operation and escalation systems comprise supporting server(s) and repositor(ies), and in some embodiments, are further configured to engage with internal resources, external resources, internal applications, and/or external applications.

As used herein, the term "operation and escalation management server" refers to a software platform and associated hardware that is configured to, inter alia, manage the various interfaces and/or interface components and associated functionality of the network environment operation and escalation system. For example, in some embodiments, the operation and escalation management server is configured to generate, manage, output, and/or update software development network environment operations action interfaces, non-software development network environment interfaces, software development network environment escalate action aggregation interface components, software development network environment operations data interface components, non-software development network environment event data interface components, and/or non-software development network environment escalate trigger interface components.

As another example, in some embodiments, the operation and escalation management server is configured to identify, determine, generate, and/or output non-software development network environment escalate action data, non-software development network environment escalate action characteristic sets, historical non-software development network environment escalate action characteristic sets, software development network environment operations data, non-software development network environment escalate action data, non-software development network environment escalate trigger events, non-software development network environment escalate action items, and/or software development network environment operations items.

As another example, in some embodiments, the operation and escalation management server is configured to generate, train, and/or refine escalate action characteristic models and/or trained machine learning models. As another example, is some embodiments, the operation and escalation management server is configured to identify, determine, capture, and/or modify software development network environment access permissions and/or non-software development network environment escalate trigger events. The functionality of the operation and escalation management server may be provided via a single server or collection of servers having a common functionality, or the functionality of the operation and escalation management server may be segmented among a plurality of servers or collections of servers (e.g., a cloud networking environment, microservices, and/or the like) performing subsets of the described functionality of the operation and escalation management server.

As used herein, the term "software development network environment data repository" refers to a location, such as a database stored on a memory device, which is accessible by one or more computing devices for retrieval and storage of data associated with the network environment operation and escalation system. For example, the software development network environment data repository may include software development network environment operations data, software development network environment operations items, software development network environment operations characteristic sets, and/or the like. The software development network environment data repository may be a dedicated device and/or a part of a larger repository. The software development network environment data repository may be dynamically updated or be static. In some embodiments, the software development network environment data repository is encrypted in order to limit unauthorized access of data associated with the network environment operation and escalation system.

As used herein, the term "non-software development network environment data repository" refers to a location, such as a database stored on a memory device, which is accessible by one or more computing devices for retrieval and storage of data associated with the network environment operation and escalation system. For example, the non-software development network environment data repository may include non-software development network environment escalate action data, non-software development network environment escalate action characteristic sets, historical non-software development network environment escalate action characteristic sets, non-software development network environment escalate action data, non-software development network environment escalate trigger events, non-software development network environment escalate action items, and/or the like. The non-software development network environment data repository may be a dedicated device and/or a part of a larger repository. The non-software development network environment data repository may be dynamically updated or be static. In some embodiments, the non-software development network environment data repository is encrypted in order to limit unauthorized access of data associated with the network environment operation and escalation system.

As used herein, the terms "network environment operation and escalation application" or "network environment operation and escalation app" refer to a dedicated software program, application, platform, service, web browser, or computer-executable application software programmed or configured to run on a client device which provides a user (e.g., a network environment user) access to the network environment operation and escalation system and its associated functionality. In some embodiments, the network environment operation and escalation application may include hardware, software, or combinations thereof operating remotely (e.g., on a server). In some embodiments, the network environment operation and escalation application is designed to execute on mobile devices, such as tablets or smartphones. For example, in certain embodiments, an app is provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

As used herein, the term "network environment user" refers to one or more users, such as an individual contributor, team member, team leader, etc., associated with the network environment operation and escalation system. In some embodiments, a network environment user may be one of a non-software development network environment user or a software development network environment user.

As used herein, the term "non-software development network environment user" refers to one or more users, such as an individual contributor, team member, team leader, etc., associated with non-software development aspects of the network environment operation and escalation system. In some embodiments, a non-software development network environment user may be associated with data stored in a non-software development network environment data repository. For example, a non-software development network environment user may be associated with non-software development network environment escalate action data, non-software development network environment escalate action characteristic sets, historical non-software development network environment escalate action characteristic sets, non-software development network environment escalate action data, non-software development network environment escalate trigger events, non-software development network environment escalate action items, and/or the like.

As used herein, the term "software development network environment user" refers to one or more users, such as an individual contributor, team member, team leader, etc., associated with software development aspects of the network environment operation and escalation system. In some embodiments, a software development network environment user may be associated with data stored in a software development network environment data repository. For example, a software development network environment user may be associated with software development network environment operations data, software development network environment operations items, and/or the like.

As used herein, the term "software development network environment operations action interface" refers to a graphical user interface of a network environment operation and escalation system that is configured to enable one or more software development network environment users to view and engage with one or more network environment operation and escalation system workspaces, views, and/or interface components. In some embodiments, for example, a software development network environment operations action interface is configured to enable one or more software development network environment users to view and engage with one or more of a software development network environment escalate action aggregation interface component, a software development network environment escalate action communication interface component, and/or a software development network environment operations data interface component. In some embodiments, a software development network environment operations action interface may be rendered to a client device based on data provided by the network environment operation and escalation system (e.g., using an operation and escalation management server). In some embodiments, such data and instructions are facilitated by a dedicated software application running on the client device. In other embodiments, such data and instructions are provided through a web browser running on the client device.

As used herein, the term "non-software development network environment escalate action item" refers to one or more items of data representative of a problem, error, fault, and/or the like requiring analysis, diagnosis, repair, resolution, and/or the like by a software development network environment user, an operation and escalation management server, and/or a network environment operation and escalation system.

As used herein, the term "non-software development network environment escalate action data" refers to one or more items of data indicative of one or more non-software development network environment escalate action items. In some embodiments, non-software development network environment escalate action data may be stored in a non-software development network environment data repository.

As used herein, the term "non-software development network environment escalate action characteristic set" refers to one or more items of data representative of characteristics associated with one or more non-software development network environment escalate action items. In some embodiments, a non-software development network environment escalate action characteristic set may be indicative of one or more of a key identifier, an item nature indication, a component identifier, a service identifier, a network environment user identifier, and/or an action status associated with each of one or more non-software development network environment escalate action items. In some embodiments, a non-software development network environment escalate action characteristic set may be based at least in part on non-software development network environment escalate action data. In some embodiments, a non-software development network environment escalate action characteristic set may be stored in a non-software development network environment data repository.

As used herein, the term "key identifier" refers to one or more items of data by which a non-software development network environment escalate action item may be identified within a network environment operation and escalation system. For example, a key identifier may comprise text string(s), numerical character(s), alphabetical character(s), alphanumeric code(s), American Standard Code for Information Interchange (ASCII) character(s), encryption keys, identification certificates, a pointer, an Internet Protocol (IP) address, a MAC address, a URL, a memory address, other unique identifier, or a combination thereof configured to identify a non-software development network environment escalate action item within a network environment operation and escalation system.

As used herein, the term "item nature indication" refers to data by which a nature (e.g., problem with PayWise transfers, runtime error, authentication failure, request for new software feature, software feature not working as expected, and/or the like) of a non-software development network environment escalate action item may be indicated within a network environment operation and escalation system. For example, an item nature indication may comprise text string(s), numerical character(s), alphabetical character(s), alphanumeric code(s), American Standard Code for Information Interchange (ASCII) character(s), encryption keys, identification certificates, a pointer, an Internet Protocol (IP) address, a MAC address, a URL, a memory address, other unique identifier, or a combination thereof configured to indicate a nature of a non-software development network environment escalation action item within a network environment operation and escalation system.

As used herein, the term "component identifier" refers to data by which a component (e.g., a dashboard, authentication component, components associated with a particular feature, components associated with a particular workflow, and/or the like) associated with a non-software development network environment escalate action item may be identified within a network environment operation and escalation system. For example, a component identifier may comprise text string(s), numerical character(s), alphabetical character(s), alphanumeric code(s), American Standard Code for Information Interchange (ASCII) character(s), encryption keys, identification certificates, a pointer, an Internet Protocol (IP) address, a MAC address, a URL, a memory address, other unique identifier, or a combination thereof configured to identify a component associated with a non-software development network environment escalation action item within a network environment operation and escalation system.

As used herein, the term "service identifier" refers to data by which a service (e.g., a payment platform and/or the like), associated with a non-software development network environment escalate action item may be identified within a network environment operation and escalation system. For example, a service identifier may comprise text string(s), numerical character(s), alphabetical character(s), alphanumeric code(s), American Standard Code for Information Interchange (ASCII) character(s), encryption keys, identification certificates, a pointer, an Internet Protocol (IP) address, a MAC address, a URL, a memory address, other unique identifier, or a combination thereof configured to identify a service associated with a non-software development network environment escalation action item within a network environment operation and escalation system.

As used herein, the term "network environment user identifier" refers to data by which a network environment user (e.g., a non-software development network environment user and/or a software development network environment user) associated with a non-software development network environment escalate action item is identified within a network environment operation and escalation system. For example, a network environment user identifier may comprise text string(s), numerical character(s), alphabetical character(s), alphanumeric code(s), American Standard Code for Information Interchange (ASCII) character(s), encryption keys, identification certificates, a pointer, an Internet Protocol (IP) address, a MAC address, a URL, a memory address, other unique identifier, or a combination thereof configured to identify a network environment user identifier associated with a non-software development network environment escalate action item within a network environment operation and escalation system.

As used herein, the term "action status" refers to one or more items of data by which a current status (e.g., future, active, accepted, completed, past, planned, unplanned, pending, in progress, waiting for developer, resolved, and/or the like) of a non-software development network environment escalate action item is identified within a network environment operation and escalation system. For example, an action status may comprise text string(s), numerical character(s), alphabetical character(s), alphanumeric code(s), American Standard Code for Information Interchange (ASCII) character(s), encryption keys, identification certificates, a pointer, an Internet Protocol (IP) address, a MAC address, a URL, a memory address, other unique identifier, or a combination thereof configured to identify an action status of a non-software development network environment escalate action item within a network environment operation and escalation system.

As used herein, the term "software development network environment escalate action aggregation interface component" refers to a graphical user interface element that is rendered to, or as a portion of, a software development network environment operations action interface of a network environment operation and escalation system. In some embodiments, a software development network environment escalate action aggregation interface component may be configured to display one or more non-software development network environment escalate action items. For example, a software development network environment escalate action aggregation interface component may be configured to display an aggregated group of non-software development network environment escalate action items. In some embodiments, a software development network environment escalate action aggregation interface component may be configured to be rendered on a software development network environment operations action interface proximate a software development network environment operations data interface component.

In some embodiments, a software development network environment escalate action aggregation interface component may be configured to display a non-software development network environment escalate action characteristic set associated with one or more non-software development network environment escalate action items displayed on a software development network environment escalate action aggregation interface component. In this regard, for example, a software development network environment escalate action aggregation interface component may be configured to display a key identifier interface component comprising one or more key identifiers associated with a non-software development network environment escalate action characteristic set. As another example, a software development network environment escalate action aggregation interface component may be configured to display an item nature indication interface component comprising one or more item nature indications associated with a non-software development network environment escalate action characteristic set.

As another example, a software development network environment escalate action aggregation interface component may be configured to display a component identifier interface component comprising one or more component identifiers associated with a non-software development network environment escalate action characteristic set. As another example, a software development network environment escalate action aggregation interface component may be configured to display a service identifier interface component comprising one or more service identifiers associated with a non-software development network environment escalate action characteristic set. As another example, a software development network environment escalate action aggregation interface component may be configured to display a network environment user identifier interface component comprising one or more network environment user identifiers associated with a non-software development network environment escalate action characteristic set. As another example, a software development network environment escalate action aggregation interface component may be configured to display an action status interface component comprising one or more action statuses associated with a non-software development network environment escalate action characteristic set.

As used herein, the term "software development network environment escalate action communication interface component" refers to a graphical user interface element that is rendered to, or as a portion of, a software development network environment operations action interface of a network environment operation and escalation system. In some embodiments, a software development network environment escalate action communication interface component may be configured to display a communication portal interface component. In some embodiments, a communication portal interface component may be configured to enable one or more software development network environment users and/or one or more non-software development network environment users to communicate about a non-software development network environment escalate action item. In some embodiments, a software development network environment escalate action communication interface component may be configured to display at least a portion of a non-software development network environment escalate action item via a communication portal interface component.

As used herein, the term "escalate action characteristic model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). The escalate action characteristic model may be configured to determine a non-software development network environment escalate action characteristic set. In some embodiments, the escalate action characteristic model may be configured to determine a non-software development network environment escalate action characteristic set based at least in part on non-software development network environment escalate action data. In some embodiments, the escalate action characteristic model may be a trained machine learning model. In some embodiments, the escalate action characteristic model may be trained using one or more historical non-software development network environment escalate action characteristic sets.

As used herein, the term "historical non-software development network environment escalate action characteristic set" refers to one or more items of data representative of characteristics associated with one or more historical non-software development network environment escalate action items. In some embodiments, a historical non-software development network environment escalate action characteristic set may be indicative of one or more of a historical key identifier, a historical item nature indication, a historical component identifier, a historical service identifier, a historical network environment user identifier, and/or a historical action status associated with each of one or more historical non-software development network environment escalate action items. In some embodiments, a historical non-software development network environment escalate action characteristic set may be based at least in part on historical non-software development network environment escalate action data. In some embodiments, a historical non-software development network environment escalate action characteristic set may be stored in a non-software development network environment data repository.

As used herein, the term "software development network environment operations item" refers to one or more items of data representative of a software development task, a software development work item, a software development operation, a software development work unit, a software development project, a software development issue, and/or the like associated with a software development network environment user (e.g., bug fixing, feature development, triaging matters among software development network environment users, and/or the like).

As used herein, the term "software development network environment operations data" refers to one or more items of data indicative of one or more software development network environment operations items. In some embodiments, software development network environment operations data may be stored in a software development network environment data repository.

As used herein, the term "software development network environment operations characteristic set" refers to one or more items of data representative of characteristics associated with one or more software-development network environment operations items. In some embodiments, a software development network environment operations characteristics set may be based at least in part on software development network environment operations data. In some embodiments, a software development network environment operations characteristics set may be stored in a software development network environment data repository.

As used herein, the term "software development network environment operations data interface component" refers to a graphical user interface element that is rendered to, or as a portion of, a software development network environment operations action interface of a network environment operation and escalation system. In some embodiments, a software development network environment operations data interface component may be configured to display one or more software development network environment operations items. For example, a software development network environment operations data interface component may be configured to display an aggregated group of non-software development network environment operations items. In some embodiments, a software development network environment operations data interface component may be configured to be rendered on a software development network environment operations action interface proximate a software development network environment escalate action aggregation interface component.

As used herein, the term "non-software development network environment interface" refers to a graphical user interface of a network environment operation and escalation system that is configured to enable one or more non-software development network environment users to view and engage with one or more network environment operation and escalation system workspaces, views, and/or interface components. In some embodiments, for example, a non-software development network environment interface is configured to enable one or more non-software development network environment users to view and engage with one or more of a non-software development network environment interface component and/or a non-software development network environment escalate trigger interface component. In some embodiments, a software development network environment operations action interface may be rendered to a client device based on data provided by the network environment operation and escalation system (e.g., using an operation and escalation management server). In some embodiments, such data and instructions are facilitated by a dedicated software application running on the client device. In other embodiments, such data and instructions are provided through a web browser running on the client device.

As used herein, the term "non-software development network environment event data interface component" refers to a graphical user interface element that is rendered to, or as a portion of, a non-software development network environment event data interface of a network environment operation and escalation system. In some embodiments, a non-software development network environment event data interface component may be configured to display one or more non-software development network environment escalate action items. In some embodiments, a non-software development network environment event data interface component may be configured to display a non-software development network environment escalate trigger interface component. In some embodiments, a non-software development network environment event data interface component may be generated based at least in part on a portion of a non-software development network environment escalate action data (e.g., an item nature indication).

As used herein, the term "non-software development network environment escalate trigger interface component" refers to a graphical user interface element that is rendered to, or as a portion of, a non-software development network environment event data interface component. In some embodiments, a non-software development network environment escalate trigger interface component may be configured to identify, capture, generate, and/or the like one or more non-software development network environment escalate trigger events initiated by a non-software development network environment user, an operation and escalation management server, and/or a network environment operation and escalation system.

As used herein, the term "non-software development network environment escalate trigger event" refers to one or more items of data representative of an event by which a non-software development network environment escalate action item is identified for analysis diagnosis, repair, resolution, and/or the like by a software development network environment user, an operation and escalation management server, and/or a network environment operation and escalation system.

As used herein, the term "software development network environment access permission" refers to one or more items of data representative of a permission for a software development network environment user to access a non-software development network environment escalate action item. In some embodiments, a software development network environment access permission may be configured to modified. For example, a software development network environment access permission may be modified such that a software development network environment user has permission to access a non-software development network environment escalate action item (e.g., a software development network environment user has permission to access a non-software development network environment escalate action item via a software development network environment escalate action aggregation interface component). As another example, a software development network environment access permission may be modified such that a software development network environment user does not have permission to access a non-software development network environment escalate action item. In some embodiments, a software development network environment access permission may be modified based at least in part on a non-software development network environment escalate trigger event. For example, a non-software development network environment escalate trigger event may cause a software development network environment access permission to be modified such that a software development network environment user has permission to access a non-software development network environment escalate action item.

The terms "data," "content," "digital content," "digital content object," "signal," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

As used herein, the term "computer-readable storage medium" refers to a non-transitory, physical, or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization, or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," "network device," "computer," "user equipment," and similar terms may be used interchangeably to refer to computer hardware and/or software that is configured to access a service made available by a server (e.g., an operation and escalation management server). The server is often (but not always) on another computer system, in which case the client device accesses the service by way of a network. Client devices may include, without limitation, smart phones, tablet computers, laptop computers, wearables, personal computers, enterprise computers, and the like.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As used herein, the terms "application," "software application," "app," "product," "service" or similar terms refer to a computer program or group of computer programs designed to perform coordinated functions, tasks, or activities for the benefit of a user or group of users. A software application can run on a server or group of servers (e.g., a physical or virtual servers in a cloud-based computing environment). In certain embodiments, an application is designed for use by and interaction with one or more local, networked, or remote computing devices, such as, but not limited to, client devices. Non-limiting examples of an application comprise project management, workflow engines, software incident management, team collaboration suites, cloud services, word processors, spreadsheets, accounting applications, web browsers, email clients, media players, file viewers, videogames, audio-video conferencing, and photo/video editors. In some embodiments, an application is a cloud product.

The terms "database," "resource," "repository," and/or similar terms used herein interchangeable may refer to a collection of records or data that is stored in a computer-readable storage medium using one or more database types. The term "database type" may refer to a type of database, such as a hierarchical database, network database, relational database (e.g., Aurora, RDS), entity-relationship database, object database (e.g., S3), document database, semantic database, graph database, noSql database (e.g., DynamoDB), and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the terms "illustrative," "example," "exemplary" and the like are used to mean "serving as an example, instance, or illustration" with no indication of quality level. Any implementation described herein as "exemplary" or "example" is not necessarily to be construed as preferred or advantageous over other implementations.

The terms "about," "approximately," "generally," "substantially," or the like, when used with a number, may mean that specific number, or alternatively, a range in proximity to the specific number, as understood by persons of skill in the art field and may be used to refer to within manufacturing and/or engineering design tolerances for the corresponding materials and/or elements as would be understood by the person of ordinary skill in the art, unless otherwise indicated.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

If the specification presents a list, unless stated otherwise, it is to be understood that each individual element of that list, and every combination of components of that list, is a separate embodiment. For example, "1, 2, 3, 4, and 5" encompasses, among numerous embodiments, 1; 2; 3; 1 and 2; 3 and 5; 1, 3, and 5; and 1, 2, 4, and 5.

The term "plurality" refers to two or more items.

The term "set" refers to a collection of one or more items.

The term "or" is used herein in both the alternative and conjunctive sense, unless otherwise indicated.

EXAMPLE SYSTEMS AND APPARATUSES OF THE DISCLOSURE

Referring now to FIG. 1, an example computing system 100 architecture within which some embodiments of the present disclosure operate is illustrated. The example computing system 100 comprises one or more software development tools 106A-106N, network environment operation and escalation system 200, and a plurality of client devices 101A-101N, each communicatively connected through a communications network 102. Accordingly, user(s) (e.g., team member, individual contributor, team leader, designer, network environment users, etc.) may access the network environment operation and escalation system 200 via the communications network 102 using one or more of client devices 101A-101N. Network environment operation and escalation system 200 may comprise an operation and escalation management server 210 in communication with at least one repository, such as a software development network environment data repository 215 and/or a non-software development network environment data repository 220. Such repository(ies) may be hosted by the operation and escalation management server 210 or otherwise hosted by devices in communication with the operation and escalation management server 210.

Operation and escalation management server 210 may include circuitry, networked processors, or the like configured to perform some or all of the operation and escalation management server-based processes described herein and may be any suitable network server and/or other type of processing device. In some embodiments, operation and escalation management server 210 may determine and transmit commands and instructions for rendering one or more software development network environment operations action interfaces and/or one or more non-software development network environment interfaces to client devices 101A-101N, using data from, for example, the software development network environment data repository 215 and/ or the non-software development network environment data repository 220. In this regard, the operation and escalation management server 210 may be embodied by any of a variety of devices, for example, the operation and escalation management server 210 may be embodied as a computer or a plurality of computers. For example, operation and escalation management server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, operation and escalation management server 210 may be located remotely from the software development network environment data repository 215 and/ or the non-software development network environment data repository 220, although in other embodiments, the operation and escalation management server 210 may comprise the software development network environment data repository 215 and/or the non-software development network environment data repository 220. The operation and escalation management server 210 may, in some embodiments, comprise several servers or computing devices performing interconnected and/or distributed functions. Despite the many arrangements contemplated herein, operation and escalation management server 210 is shown and described herein as a single computing device to avoid unnecessarily overcomplicating the disclosure.

Operation and escalation management server 210 can communicate with one or more client devices 101A-101N via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 702.11, IEEE 702.16, IEEE 702.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the network environment operation and escalation system 200.

The software development network environment data repository 215 may be stored by any suitable storage device configured to store some or all of the information described herein (e.g., memory 201 of the operation and escalation management server 210 or a separate memory system separate from the operation and escalation management server 210, such as one or more database systems, backend data servers, network databases, cloud storage devices, or the like provided by another device (e.g., online application or 3$^{rd}$ party provider), such as a Network Attached Storage (NAS) device or devices, or as a separate database server or servers. The software development network environment data repository 215 may comprise data received from the operation and escalation management server 210 (e.g., via a memory 201 and/or processor(s) 202), and the corresponding storage device may thus store this data. The software development network environment data repository 215 includes information accessed and stored by the operation and escalation management server 210 to facilitate the operations of the network environment operation and escalation system 200. As such, the software development network environment data repository 215 may include, for example, without limitation, include software development network environment operations data, software development network environment operations items, and/or the like.

The non-software development network environment data repository 220 may be stored by any suitable storage device configured to store some or all of the information described herein (e.g., memory 201 of the operation and escalation management server 210 or a separate memory system separate from the operation and escalation management server 210, such as one or more database systems, backend data servers, network databases, cloud storage devices, or the like provided by another device (e.g., online application or 3$^{rd}$ party provider), such as a Network Attached Storage (NAS) device or devices, or as a separate database server or servers.

The non-software development network environment data repository 220 may comprise data received from the operation and escalation management server 210 (e.g., via a memory 201 and/or processor(s) 202), and the corresponding storage device may thus store this data. The non-software development network environment data repository 220 includes information accessed and stored by the operation and escalation management server 210 to facilitate the operations of the network environment operation and escalation system 200. As such, the non-software development network environment data repository 220 may include, for example, without limitation, include non-software development network environment escalate action data, non-software development network environment escalate action characteristic sets, historical non-software development network environment escalate action characteristic sets, non-software development network environment escalate action data, non-software development network environment escalate trigger events, non-software development network environment escalate action items, and/or the like.

Software development tools 106A-106N may be any one or more underlying software development tools (e.g., Bitbucket®, etc.).

The client devices 101A-101N may be implemented as any computing device as defined above. Electronic data received by the operation and escalation management server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting the software development network environment operations action interface and/or the non-software development network environment interface to a user (e.g., a network environment user) and otherwise providing access to the network environment operation and escalation system 200. The depiction in FIG. 2 of "N" client devices is merely for illustration purposes. According to some embodiments, the client devices 101A-101N may be configured to display an interface on a display of the client device for viewing, creating, editing, and/or otherwise interacting with at least the software development network environment operations action interface and/or the non-software development network environment interfaces, which may be provided by the network environment operation and escalation system 200. According to further embodiments, the client devices 101A-101N may be configured to generate and/or display a software development network environment escalate action aggregation interface component, a software development network environment escalate action communication interface component, a software development network environment operations data interface component, a non-software development network environment event data interface component, a non-software development network environment escalate trigger interface component, and/or the like.

In embodiments where a client device 101A-101N is a mobile device, such as a smartphone or tablet, the client device 101A-101N may execute an "app" to interact with the network environment operation and escalation system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 101A-101N may interact with the network environment operation and escalation system 200 via a web browser. As yet another example, the client devices 101A-101N may include various hardware or firmware designed to interface with the network environment operation and escalation system 200.

Example Apparatus for Implementing Embodiments of the Present Disclosure

FIG. 2 illustrates an example operation and escalation management server 210 in accordance with at least some example embodiments of the present disclosure. In accordance with some example embodiments, operation and escalation management server 210 may include various components, modules, circuitries, or means, some or all of which may be also or instead be included in one or more client device(s) 101A-101N. In accordance with some example embodiments, operation and escalation management server 210 may be configured, using one or more of the sets of circuitry embodying memory 201, processor 202, input/output circuitry 203, communications circuitry 204, and/or network environment operation and escalation circuitry 205 to execute and perform the operations described herein. In some embodiments, network environment operation and escalation circuitry 205 is included in operation and escalation management server 210 and/or client device 101A, the circuitry configured to facilitate the functionality discussed herein regarding generating software development network environment escalate action aggregation interface components, software development network environment escalate action communication interface components, software development network environment operations data interface components, non-software development network environment event data interface components, non-software development network environment escalate trigger interface components, and/or the like. It will be appreciated that while various references are made herein to a "server" or "servers" such references are not intended to implicate monolithic servers. Rather, as will be apparent to one of ordinary skill in the art in view of this disclosure, the operations and functionality attributed to any disclosed server may be performed in a cloud computing environment and thereby completed by multiple servers.

Although the use of the term "circuitry" as used herein with respect to components 201-205 are described in some cases with respect to functional limitations, it should be understood that the particular implementations necessarily include the use of particular hardware configured to perform the functions associated with the respective circuitry as described herein. It should also be understood that certain of these components 201-205 may include similar or common hardware. For example, two sets of circuitry may both leverage use of the same processor(s), network interface(s), storage medium(s), and/or the like, to perform their associated functions, such that duplicate hardware is not required for each set of circuitry. The use of the term "circuitry" with respect to components of the apparatuses described herein should therefore be understood to include particular hardware configured to perform the functions associated with the respective components or particular circuitry as described herein.

The term "circuitry" should also be understood, in some embodiments, to include software for configuring the hardware. For example, in some embodiments, "circuitry" may include processing circuitry, storage media, network interfaces, input/output devices, and the like. In some embodiments, such as in examples where circuitry is included with operation and escalation management server 210, other elements of the operation and escalation management server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, operation and escalation management server 210. The memory 201 is non-transitory and may include, for example, one or more volatile and/or non-volatile memories, or some combination thereof. In other words, for example, the memory 201 may be an electronic storage device (e.g., a computer readable storage medium). The memory 201 may be configured to store information, data, content, applications, instructions, or the like, for enabling an apparatus, e.g., operation and escalation management server 210 to carry out various functions in accordance with example embodiments of the present disclosure.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling operation and escalation management server 210 to carry out various functions in accordance with example embodiments discussed herein. For example, in at least some embodiments, memory 201 is configured to buffer data for processing by processor 202. Additionally, or alternatively, in at least some embodiments, memory 201 is configured to store program instructions for execution by processor 202. Memory 201 may store information in the form of static and/or dynamic information. This stored information may be stored and/or used by operation and escalation management server 210 during the course of performing its functionalities.

Processor 202 may be embodied in a number of different ways and may, for example, include one or more processing devices configured to perform independently. Additionally, or alternatively, processor 202 may include one or more processors configured in tandem via a bus to enable independent execution of instructions, pipelining, and/or multithreading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as operation and escalation management server 210. The plurality of processors may be in operative communication with each other and may be collectively configured to perform one or more functionalities of operation and escalation management server 210 as described herein.

In an example embodiment, processor 202 is configured to execute instructions stored in the memory 201 or otherwise accessible to processor 202. Alternatively, or additionally, the processor 202 may be configured to execute hardcoded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause operation and escalation management server 210 to perform one or more of the functionalities of operation and escalation management server 210 as described herein.

In some embodiments, input/output circuitry 203 may, in turn, be in communication with processor 202 to provide an audible, visual, mechanical, or other output and/or, in some embodiments, to receive an indication of an input. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface (e.g., non-software development network environment interface) and may comprise a web user interface, a mobile application, a kiosk, or the like. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In some embodiments, aspects of input/output circuitry 203 in operation and escalation management server 210 may be reduced when implemented also or instead as an end-user machine or other type of device designed for complex user interactions (i.e., client device 101). In some embodiments (like other components discussed herein), input/output circuitry 203 may even be eliminated from operation and escalation management server 210. Alternatively, at least some aspects of input/output circuitry 203 may be embodied on an apparatus used by a user (e.g., a team member, an individual contributor, a network environment user, and/or the like) that is in communication with operation and escalation management server 210. Input/ output circuitry 203 may be in communication with memory 201, communications circuitry 204, and/or any other component(s), such as via a bus. Although more than one input/output circuitry and/or other component can be included in operation and escalation management server 210, only one is shown in FIG. 2 to avoid overcomplicating the disclosure (e.g., like the other components discussed herein).

Communications circuitry 204 may be any means such as a device or circuitry embodied in either hardware or a combination of hardware and software that is configured to receive and/or transmit data from/to a network and/or any other device, circuitry, or module in communication with operation and escalation management server 210. In this regard, the communications circuitry 204 may include, for example, a network interface for enabling communications with a wired or wireless communication network. Communications circuitry 204 may be configured to receive and/or transmit any data that may be stored by memory 201 using any protocol that may be used for communications between computing devices. For example, the communications circuitry 204 may include one or more network interface cards, antennae, transmitters, receivers, buses, switches, routers, modems, and supporting hardware and/or software, and/or firmware/software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by operation and escalation management server 210 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of operation and escalation management server 210, such as via a bus.

In some embodiments, network environment operation and escalation circuitry 205 may also or instead be included and configured to perform the functionality discussed herein related to providing a software development network environment operations action interface, a non-software development network environment interface, a software development network environment escalate action aggregation interface component, a software development network environment escalate action communication interface component, a software development network environment operations data interface component, a non-software development network environment event data interface component, a non-software development network environment escalate trigger interface component, and/or the like. Network environment operation and escalation circuitry 205 includes hardware components and/or software configured to support interface component functionality, features, and/or services of the operation and escalation management server 210. In some embodiments, network environment operation and escalation circuitry 205 includes hardware components and/ or software configured to support a escalate action characteristic model machine learning model to generate and/or determine non-software development network environment escalate action characteristic set, features, and/or services of the operation and escalation management server 210. The network environment operation and escalation circuitry 205 may utilize processing circuitry, such as the processor 202, to perform its corresponding operations, and may utilize memory 201 to store collected information. The network environment operation and escalation circuitry 205 may send and/or receive data from software development network environment data repository 215 and/or the non-software development network environment data repository 220. In some implementations, the sent and/or received data may include software development network environment operations data, software development network environment operations items, non-software development network environment escalate action data, non-software development network environment escalate action characteristic sets, historical non-software development network environment escalate action characteristic sets, non-software development network environment escalate action data, non-software development network environment escalate trigger events, non-software development network environment escalate action items, and associated data that is associated with, for example, generating a software development network environment operations action interface, a non-software development network environment interface, a software development network environment escalate action aggregation interface component, a software development network environment escalate action communication interface component, a software development network environment operations data interface component, a non-software development network environment event data interface component, a non-software development network environment escalate trigger interface component, and/or the like.

It should also be appreciated that, in some embodiments, the network environment operation and escalation circuitry 205 may include a separate processor, specially configured field programmable gate array (FPGA), or application specific interface circuit (ASIC) to perform its corresponding functions. For example, in some embodiments, some or all of the functionality of network environment operation and escalation circuitry 205 may be performed by processor 202. In this regard, some or all of the example processes and algorithms discussed herein can be performed by at least one processor 202 and/or network environment operation and escalation circuitry 205. For example, non-transitory computer readable storage media can be configured to store firmware, one or more application programs, and/or other software, which include instructions and other computer-readable program code portions that can be executed to control processors of the components of operation and escalation management server 210 to implement various operations, including the examples shown herein. As such, a series of computer-readable program code portions may be embodied in one or more computer program products and can be used, with a device, operation and escalation management server 210, database, and/or other programmable apparatus, to produce the machine-implemented processes discussed herein. It is also noted that all or some of the information discussed herein can be based on data that is received, generated and/or maintained by one or more components of the operation and escalation management server 210. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor, or other programmable apparatus's circuitry to produce a machine, such that the computer, processor, or other programmable circuitry that execute the code on the machine creates the means for implementing various functions, including those described herein in connection with the components of operation and escalation management server 210.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a planning user interacting with the client device). Information/data generated at the client device (e.g., a result of the user interaction) can be received from the client device at the server.

In various embodiments of the present disclosure, an apparatus (e.g., the operation and escalation management server 210) may be configured to generate, output, manage, and/or cause rendering of a software development network environment escalate action aggregation interface component of a network environment operation and escalation system 200. For example, an apparatus (e.g., the operation and escalation management server 210) may be configured to output and/or cause rendering of a software development network environment escalate action aggregation interface component on a software development network environment operations action interface of the network environment operation and escalation system 200. FIG. 3 illustrates an example software development network environment escalate action aggregation interface component 300 structured in accordance with various embodiments of the present disclosure. In some embodiments, the apparatus (e.g., operation and escalation management server 210) causes rendering of the software development network environment escalate action aggregation interface component 300 to a visual display of a computing device (e.g., a client device 101A-101N).

In some embodiments, the software development network environment escalate action aggregation interface component 300 may be configured to display a non-software development network environment escalate action item. For example, the software development network environment escalate action aggregation interface component 300 may be configured to display a non-software development network environment escalate action item 314. Additionally, or alternatively, the software development network environment escalate action aggregation interface component may be configured to display an aggregated group of non-software development network environment escalate action items 316. Although in the non-limiting example depicted in FIG. 3, the software development network environment escalate action aggregation interface component 300 includes nine non-software development network environment escalate action items, it would be understood by one skilled in the field to which this disclosure pertains that the software development network environment escalate action aggregation interface component 300 may be configured to display any number of non-software development network environment escalate action items.

In some embodiments, the software development network environment escalate action aggregation interface component 300 may be configured to display a non-software development network environment escalate action characteristic set associated with one or more non-software development network environment escalate action items displayed on the software development network environment escalate action aggregation interface component 300. In this regard, for example, the software development network environment escalate action aggregation interface component 300 may be configured to display a key identifier interface component 302 comprising one or more key identifiers associated with a non-software development network environment escalate action characteristic set (e.g., CS-42). As another example, the software development network environment escalate action aggregation interface component 300 may be configured to display an item nature indication interface 304 component comprising one or more item nature indications associated with a non-software development network environment escalate action characteristic set (problem with PayWise transfers, runtime error, authentication failure, request for new software feature, software feature not working as expected, and/or the like). As another example, the software development network environment escalate action aggregation interface component 300 may be configured to display a component identifier interface component 306 comprising one or more component identifiers associated with a non-software development network environment escalate action characteristic set (e.g., a dashboard, authentication component, components associated with a particular feature, components associated with a particular workflow, and/or the like).

As another example, the software development network environment escalate action aggregation interface component 300 may be configured to display a service identifier interface component 308 comprising one or more service identifiers associated with a non-software development network environment escalate action characteristic set (e.g., a payment platform and/or the like). As another example, the software development network environment escalate action aggregation interface component 300 may be configured to display a network environment user identifier interface component 310 comprising one or more network environment user identifiers associated with a non-software development network environment escalate action characteristic set (e.g., Unassigned, Quinn Elbaz, etc.). As another example, the software development network environment escalate action aggregation interface component 300 may be configured to display an action status interface component 312 comprising one or more action statuses associated with a non-software development network environment escalate action characteristic set (e.g., waiting for developer).

In various embodiments of the present disclosure, an apparatus (e.g., the operation and escalation management server 210) may be configured to generate, determine, and/or output the non-software development network environment escalate action characteristic set based at least in part on an escalate action characteristic model. In this regard, for example, the escalate action characteristic model may be configured to generate, determine, and/or output the non-software development network environment escalate action characteristic set based at least in part on non-software development environment escalate action data.

In some embodiments, the escalate action characteristic model may be a trained machine learning model. In some embodiments, the escalate action characteristic model may be trained using one or more historical non-software development network environment escalate action characteristic sets. In some embodiments, a historical non-software development network environment escalate action characteristic set may be one or more items of data representative of characteristics associated with a historical non-software development network environment escalate action item. For example, a historical non-software development network environment escalate action characteristic set may be indicative of one or more of a historical key identifier, a historical item nature indication, a historical component identifier, a historical service identifier, a historical network environment user identifier, and/or a historical action status associated with a historical non-software development network environment escalate action item.

In various embodiments of the present disclosure, an apparatus (e.g., the operation and escalation management server 210) may be configured to generate, output, manage, and/or cause rendering of a software development network environment escalate action communication interface component of the network environment operation and escalation system 200. For example, an apparatus (e.g., the operation and escalation management server 210) may be configured to output and/or cause rendering of a software development network environment escalate action communication interface component on a software development network environment operations action interface of the network environment operation and escalation system 200. FIG. 4 illustrates an example software development network environment escalate action communication interface component 400 structured in accordance with various embodiments of the present disclosure. In some embodiments, the apparatus (e.g., operation and escalation management server 210) causes rendering of the software development network environment escalate action communication interface component 400 to a visual display of a computing device (e.g., a client device 101A-101N).

In some embodiments, the software development network environment escalate action communication interface component 400 may be configured to display a communication portal interface component 402. In some embodiments, the communication portal interface component 402 may be configured to enable one or more software development network environment users and/or one or more non-software development network environment users to communicate about a non-software development network environment escalate action item. (e.g., Fran Perez and Jane Rotansen may communicate about a non-software development network environment escalate action item). In some embodiments, the software development network environment escalate action communication interface component 400 may be configured to display at least a portion of a non-software development network environment escalate action item via the communication portal interface component 402 (e.g., a non-software development network environment escalate action item associated with a key identifier of CS-41).

In various embodiments of the present disclosure, an apparatus (e.g., the operation and escalation management server 210) may be configured to generate, output, manage, and/or cause rendering of a software development network environment operations data interface component of the network environment operation and escalation system 200. For example, an apparatus (e.g., the operation and escalation management server 210) may be configured to output and/or cause rendering of a software development network environment operations data interface component on a software development network environment operations action interface of the network environment operation and escalation system 200. FIG. 5 illustrates an example software development network environment operations data interface component 500 structured in accordance with various embodiments of the present disclosure. In some embodiments, the apparatus (e.g., operation and escalation management server 210) causes rendering of the software development network environment operations data interface component 500 to a visual display of a computing device (e.g., a client device 101A-101N).

In some embodiments, the software development network environment operations data interface component 500. may be configured to display one or more software development network environment operations items. For example, a software development network environment operations data interface component may be configured to display an aggregated group of non-software development network environment operations items.

In various embodiments of the present disclosure, an apparatus (e.g., the operation and escalation management server 210) may be configured to generate, output, manage, and/or cause rendering of a software development network environment operations action interface of a network environment operation and escalation system 200. FIG. 7 illustrates an example software development network environment operations action interface 600 structured in accordance with various embodiments of the present disclosure. In some embodiments, the apparatus (e.g., operation and escalation management server 210) causes rendering of the software development network environment operations action interface 600 to a visual display of a computing device (e.g., a client device 101A-101N).

In some embodiments, an apparatus (e.g., the operation and escalation management server 210) may be configured to output the software development network environment escalate action aggregation interface component 300, the software development network environment escalate action communication interface component 400, and/or the software development network environment operations data interface component 500 for rendering to the software development network environment operations action interface 600. In this regard, for example, the software development network environment operations action interface 600 is configured to enable one or more software development network environment users to view and engage with one or more of the software development network environment escalate action aggregation interface component 300, the software development network environment escalate action communication interface component 400, and/or the software development network environment operations data interface component 500.

In some embodiments, an apparatus (e.g., the operation and escalation management server 210) may be configured to render one or more of the software development network environment escalate action aggregation interface component 300, the software development network environment escalate action communication interface component 400, and/or the software development network environment operations data interface component 500 proximate another one or more of the software development network environment escalate action aggregation interface component 300, the software development network environment escalate action communication interface component 400, and/or the software development network environment operations data interface component 500 on the software development network environment operations action interface 600. For example, as illustrated in FIG. 6 the software development network environment escalate action aggregation interface component 300 and the software development network environment operations data interface component 500 may be rendered proximate each other on the software development network environment operations action interface 600.

Although the software development network environment escalate action aggregation interface component 300 and the software development network environment operations data interface component 500 are depicted in FIG. 6 as being arranged or rendered in a main pain of the software development network environment operations action interface 600, such depiction is for purposes of illustration and not of limitation and other suitable variations of arranging or rendering the interface components, panes, and panels to the software development network environment operations action interface 600 are also contemplated by this disclosure as will be apparent to one of ordinary skill in the art. For example, the software development network environment escalate action aggregation interface component 300 and/or the software development network environment operations data interface component 500 may be arranged or caused to be rendered in a sidebar pane of the software development network environment operations action interface 600.

Additionally, although the software development network environment escalate action aggregation interface component 300 is depicted as being arranged or rendered above the software development network environment operations data interface component 500 in FIG. 6, it would such depiction is for purposes of illustration and not of limitation and other suitable variations of arranging or rendering the interface components, panes, and panels to the software development network environment operations action interface 600 are also contemplated by this disclosure as will be apparent to one of ordinary skill in the art. For example, the software development network environment operations data interface component 500 may be arranged or caused to be rendered above the software development network environment escalate action aggregation interface component 300 on the software development network environment operations action interface 600.

In various embodiments of the present disclosure, an apparatus (e.g., the operation and escalation management server 210) may be configured to generate, output, manage, and/or cause rendering of a non-software development network environment event data interface component t of a network environment operation and escalation system 200. For example, an apparatus (e.g., the operation and escalation management server 210) may be configured to output and/or cause rendering of a non-software development network environment event data interface component on a non-software development network environment interface of the network environment operation and escalation system 200. FIG. 7 illustrates an example non-software development network environment event data interface component 700 structured in accordance with various embodiments of the present disclosure. In some embodiments, the apparatus (e.g., operation and escalation management server 210) causes rendering of the non-software development network environment event data interface component 700 to a visual display of a computing device (e.g., a client device 101A-101N). In some embodiments, a non-software development network environment event data interface component may be generated based at least in part on a portion of a non-software development network environment escalate action data (e.g., an item nature indication).

In some embodiments, the non-software development network environment event data interface component 700 may comprise a non-software development network may comprise a non-software development network environment escalate trigger interface component 702 (e.g., the non-software development network environment escalate trigger interface component 702 may occupy a portion of the non-software development network environment event data interface component 700). In some embodiments, the non-software development network environment escalate trigger interface component 702 may be configured to identify, capture, generate, and/or the like one or more non-software development network environment escalate trigger events initiated by a non-software development network environment user, the operation and escalation management server 210, and/or the network environment operation and escalation system 200.

In some embodiments, an apparatus (e.g., the operation and escalation management server 210) may be configured to modify a software development network environment access permission associated with a non-software development network environment escalate action item. In some embodiments, a software development network environment access permission may be one or more items of data representative of a permission for a software development network environment user to access a non-software development network environment escalate action item that is configured to be modified. For example, a software development network environment access permission may be modified such that a software development network environment user has permission to access a non-software development network environment escalate action item (e.g., a software development network environment user has permission to access a non-software development network environment escalate action item via a software development network environment escalate action aggregation interface component). As another example, a software development network environment access permission may be modified such that a software development network environment user does not have permission to access a non-software development network environment escalate action item. In some embodiments, a software development network environment access permission may be modified based at least in part on a non-software development network environment escalate trigger event. For example, a non-software development network environment escalate trigger event may cause a software development network environment access permission to be modified such that a software development network environment user has permission to access a non-software development network environment escalate action item.

In various embodiments of the present disclosure, an apparatus (e.g., the operation and escalation management server 210) may be configured to generate, output, manage, and/or cause rendering of a non-software development network environment interface of a network environment operation and escalation system 200. FIG. 8 illustrates an example non-software development network environment interface 800 structured in accordance with various embodiments of the present disclosure. In some embodiments, the apparatus (e.g., operation and escalation management server 210) causes rendering of the software development network environment operations action interface 600 to a visual display of a computing device (e.g., a client device 101A-101N).

In some embodiments, an apparatus (e.g., the operation and escalation management server 210) may be configured to output the non-software development network environment event data interface component 700 for rendering to the non-software development network environment interface 800. In this regard, for example, the non-software development network environment interface 800 is configured to enable one or more non-software development network environment users to view and engage with the non-software development network environment event data interface component 700. Although the non-software development network environment event data interface component 700 is depicted in FIG. 10 as being arranged or rendered in a main pane of the non-software development network environment interface 800, such depiction is for purposes of illustration and not of limitation and other suitable variations of arranging or rendering the interface components, panes, and panels to the non-software development network environment interface 800 are also contemplated by this disclosure as will be apparent to one of ordinary skill in the art. For example, the non-software development network environment event data interface component 700 may be arranged or caused to be rendered in a sidebar pane of the non-software development network environment interface 800.

Example Operations Performed

Having described example systems and apparatuses and exemplary circuitry in accordance with various embodiments of the present disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof. It will further be appreciated that the example apparatuses, systems, devices, and/or computer program products may proceed to output and/or provide a software development network environment operations action interface, a non-software development network environment interface, a software development network environment escalate action aggregation interface component, a software development network environment escalate action communication interface component, a software development network environment operations data interface component, a non-software development network environment event data interface component, a non-software development network environment ment escalate trigger interface component, and/or the like in a network environment operation and escalation system in a number of ways.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 9 is a flowchart broadly illustrating a series of operations or process blocks that are executed or performed to output a software development network environment escalate action aggregation interface component for rendering to a software development network environment operations action interface in a network environment operation and escalation system in accordance with some example embodiments of the present disclosure. In some embodiments, the method 900 is embodied by computer program code stored on a non-transitory computer-readable storage medium of a computer program product configured for execution to perform the process as depicted and described. In this regard, in some such embodiments, the operation and escalation management server 210 is specially configured by computer-coded instructions (e.g., computer program instructions) stored thereon, for example in the memory 201 and/or another component depicted and/or described herein and/or otherwise accessible to the operation and escalation management server 210, for performing the operations as depicted and described. Alternatively, or additionally, in some embodiments, the method 900 is performed by one or more specially configured computing devices, such as the operation and escalation management server 210 alone or in communication with one or more other component(s), device(s), system(s), and/or the like. For example, in some embodiments, the operation and escalation management server 210 is in communication with one or more external apparatus(es), system(s), device(s), and/or the like, to perform one or more of the operations as depicted and described. For purposes of simplifying the description, the method 900 is described as performed by and from the perspective of the operation and escalation management server 210. In this regard, performance of the operations may invoke one or more of memory 201, processor 202, input/output circuitry 203, communications circuitry 204, and/or network environment operation and escalation circuitry 205.

In the embodiment illustrated in FIG. 9, the flowchart illustrates method 900 which begins at block 902. At block 902, the operation and escalation management server 210 includes means, such as the memory 201, processor 202, input/output circuitry 203, communications circuitry 204, and/or network environment operation and escalation circuitry 205, or a combination thereof, to access non-software development network environment escalate action data. In this regard, for example, the operation and escalation management server 210 may access one or more items of data indicative of one or more non-software development network environment escalate action items. In some embodiments, the operation and escalation management server 210 may access non-software development network environment escalate action data from the non-software development network environment data repository 220 (e.g., the non-software development network environment escalate action data is retrieved from the non-software development network environment data repository 220).

At block 904, the operation and escalation management server 210 includes means, such as the memory 201, processor 202, input/output circuitry 203, communications circuitry 204, and/or network environment operation and escalation circuitry 205, or a combination thereof, to determine a non-software development network environment escalate action characteristic set based at least in part on the non-software development network environment escalate action data. In some embodiments, the non-software development network environment escalate action characteristic set may be indicative of at least one non-software development network environment escalate action item. In this regard, for example, the non-software development network environment escalate action characteristic set may be indicative of one or more of a key identifier, an item nature indication, a component identifier, a service identifier, a network environment user identifier, and/or an action status.

At block 906, the operation and escalation management server 210 includes means, such as the memory 201, processor 202, input/output circuitry 203, communications circuitry 204, and/or network environment operation and escalation circuitry 205, or a combination thereof, to generate a software development network environment escalate action aggregation interface component. In some embodiments, the software development network environment escalate action aggregation interface component may comprise the non-software development network environment escalate action item.

At block 908, the operation and escalation management server 210 includes means, such as the memory 201, processor 202, input/output circuitry 203, communications circuitry 204, and/or network environment operation and escalation circuitry 205, or a combination thereof, to output the software development network environment escalate action aggregation interface component for rendering to a software development network environment operations action interface of a computing device associated with the software development network environment escalate action aggregation interface component. In some embodiments, the software development network environment escalate action aggregation interface component may be rendered on the software development network environment operations action interface proximate another interface component. For example, the software development network environment escalate action aggregation interface component may be rendered on the software development network environment operations action interface proximate a software development network environment escalate action communication interface component and/or a software development network environment operations data interface component.

At block 910, the operation and escalation management server 210 includes means, such as the memory 201, processor 202, input/output circuitry 203, communications circuitry 204, and/or network environment operation and escalation circuitry 205, or a combination thereof, to optionally modify a software development network environment access permission associated with the non-software development network environment escalate action item. For example, a software development network environment access permission may be modified such that a software development network environment user has permission to access a non-software development network environment escalate action item (e.g., a software development network environment user has permission to access a non-software development network environment escalate action item via a software development network environment escalate action aggregation interface component). As another example, a software development network environment access permission may be modified such that a software development network environment user does not have permission to access a non-software development network environment escalate action item. In some embodiments, a software development network environment access permission may be modified based at least in part on a non-software development network environment escalate trigger event. For example, a non-software development network environment escalate trigger event may cause a software development network environment access permission to be modified such that a software development network environment user has permission to access a non-software development network environment escalate action item.

FIG. 10 is a flowchart broadly illustrating a series of operations or process blocks that are executed or performed to output a software development network environment communication interface component for rendering to a software development network environment operations action interface in a network environment operation and escalation system in accordance with some example embodiments of the present disclosure. In some embodiments, the method 1000 is embodied by computer program code stored on a non-transitory computer-readable storage medium of a computer program product configured for execution to perform the process as depicted and described. In this regard, in some such embodiments, the operation and escalation management server 210 is specially configured by computer-coded instructions (e.g., computer program instructions) stored thereon, for example in the memory 201 and/or another component depicted and/or described herein and/or otherwise accessible to the operation and escalation management server 210, for performing the operations as depicted and described. Alternatively, or additionally, in some embodiments, the method 1000 is performed by one or more specially configured computing devices, such as the operation and escalation management server 210 alone or in communication with one or more other component(s), device(s), system(s), and/or the like. For example, in some embodiments, the operation and escalation management server 210 is in communication with one or more external apparatus(es), system(s), device(s), and/or the like, to perform one or more of the operations as depicted and described. For purposes of simplifying the description, the method 1000 is described as performed by and from the perspective of the operation and escalation management server 210. In this regard, performance of the operations may invoke one or more of memory 201, processor 202, input/output circuitry 203, communications circuitry 204, and/or network environment operation and escalation circuitry 205.

In the embodiment illustrated in FIG. 10, the flowchart illustrates method 1000 which begins at block 1002. At block 1002, the operation and escalation management server 210 includes means, such as the memory 201, processor 202, input/output circuitry 203, communications circuitry 204, and/or network environment operation and escalation circuitry 205, or a combination thereof, to access non-software development network environment escalate action data. In this regard, for example, the operation and escalation management server 210 may access one or more items of data indicative of one or more non-software development network environment escalate action items. In some embodiments, the operation and escalation management server 210 may access non-software development network environment escalate action data from the non-software development network environment data repository 220 (e.g., the non-software development network environment escalate action data is retrieved from the non-software development network environment data repository 220).

At block 1004, the operation and escalation management server 210 includes means, such as the memory 201, processor 202, input/output circuitry 203, communications circuitry 204, and/or network environment operation and escalation circuitry 205, or a combination thereof, to determine a non-software development network environment escalate action characteristic set based at least in part on the non-software development network environment escalate action data. In some embodiments, the non-software development network environment escalate action characteristic set may be indicative of at least one non-software development network environment escalate action item. In this regard, for example, the non-software development network environment escalate action characteristic set may be indicative of one or more of a key identifier, an item nature indication, a component identifier, a service identifier, a network environment user identifier, and/or an action status.

At block 1006, the operation and escalation management server 210 includes means, such as the memory 201, processor 202, input/output circuitry 203, communications circuitry 204, and/or network environment operation and escalation circuitry 205, or a combination thereof, to generate a software development network environment communication interface component. In some embodiments, the software development network environment communication interface component may comprise the non-software development network environment escalate action item.

At block 1008, the operation and escalation management server 210 includes means, such as the memory 201, processor 202, input/output circuitry 203, communications circuitry 204, and/or network environment operation and escalation circuitry 205, or a combination thereof, to output the software development network environment communication interface component for rendering to a software development network environment operations action interface of a computing device associated with the software development network environment communication interface component. In some embodiments, the software development network environment communication interface component may be rendered on the software development network environment operations action interface proximate another interface component. For example, the software development network environment communication interface component may be rendered on the software development network environment operations action interface proximate a software development network environment escalate action aggregation interface component and/or a software development network environment operations data interface component.

FIG. 11 is a flowchart broadly illustrating a series of operations or process blocks that are executed or performed to output a software development network environment operations data interface component for rendering to a software development network environment operations action interface in a network environment operation and escalation system in accordance with some example embodiments of the present disclosure. In some embodiments, the method 1100 is embodied by computer program code stored on a non-transitory computer-readable storage medium of a computer program product configured for execution to perform the process as depicted and described. In this regard, in some such embodiments, the operation and escalation management server 210 is specially configured by computer-coded instructions (e.g., computer program instructions) stored thereon, for example in the memory 201 and/or another component depicted and/or described herein and/or otherwise accessible to the operation and escalation management server 210, for performing the operations as depicted and described. Alternatively, or additionally, in some embodiments, the method 1100 is performed by one or more specially configured computing devices, such as the operation and escalation management server 210 alone or in communication with one or more other component(s), device(s), system(s), and/or the like. For example, in some embodiments, the operation and escalation management server 210 is in communication with one or more external apparatus(es), system(s), device(s), and/or the like, to perform one or more of the operations as depicted and described. For purposes of simplifying the description, the method 1100 is described as performed by and from the perspective of the operation and escalation management server 210. In this regard, performance of the operations may invoke one or more of memory 201, processor 202, input/output circuitry 203, communications circuitry 204, and/or network environment operation and escalation circuitry 205.

In the embodiment illustrated in FIG. 11, the flowchart illustrates method 1100 which begins at block 1102. At block 1102, the operation and escalation management server 210 includes means, such as the memory 201, processor 202, input/output circuitry 203, communications circuitry 204, and/or network environment operation and escalation circuitry 205, or a combination thereof, to access software development network environment operations data. In this regard, for example, the operation and escalation management server 210 may access one or more items of data indicative of one or more software development network environment operations items. In some embodiments, the operation and escalation management server 210 may access the software development network environment operations data from the software development network environment data repository 215 (e.g., the software development network environment operations data is retrieved from the software development network environment data repository 215).

At block 1104, the operation and escalation management server 210 includes means, such as the memory 201, processor 202, input/output circuitry 203, communications circuitry 204, and/or network environment operation and escalation circuitry 205, or a combination thereof, to determine a software development network environment operations characteristic set based at least in part on the software development network environment operations data. In some embodiments, the software development network environment operations characteristic set may be indicative of at least one software development network environment operations item.

At block 1106, the operation and escalation management server 210 includes means, such as the memory 201, processor 202, input/output circuitry 203, communications circuitry 204, and/or network environment operation and escalation circuitry 205, or a combination thereof, to generate a software development network environment operations data interface component. In some embodiments, the software development network environment operations data interface component may comprise the software development network environment operations item.

At block 1108, the operation and escalation management server 210 includes means, such as the memory 201, processor 202, input/output circuitry 203, communications circuitry 204, and/or network environment operation and escalation circuitry 205, or a combination thereof, to output the software development network environment operations data interface component for rendering to a software development network environment operations action interface of a computing device associated with the software development network environment operations data interface component. In some embodiments, the software development network environment operations data interface component may be rendered on the software development network environment operations action interface proximate another interface component. For example, the software development network environment operations data interface component may be rendered on the software development network environment operations action interface proximate a software development network environment escalate action aggregation interface component and/or a software development network environment communication interface component.

FIG. 12 is a flowchart broadly illustrating a series of operations or process blocks that are executed or performed to output a non-software development network environment event data interface component and a non-software development network environment escalate trigger interface component for rendering to a non-software development network environment interface in a network environment operation and escalation system in accordance with some example embodiments of the present disclosure. In some embodiments, the method 1200 is embodied by computer program code stored on a non-transitory computer-readable storage medium of a computer program product configured for execution to perform the process as depicted and described. In this regard, in some such embodiments, the operation and escalation management server 210 is specially configured by computer-coded instructions (e.g., computer program instructions) stored thereon, for example in the memory 201 and/or another component depicted and/or described herein and/or otherwise accessible to the operation and escalation management server 210, for performing the operations as depicted and described. Alternatively, or additionally, in some embodiments, the method 1200 is performed by one or more specially configured computing devices, such as the operation and escalation management server 210 alone or in communication with one or more other component(s), device(s), system(s), and/or the like. For example, in some embodiments, the operation and escalation management server 210 is in communication with one or more external apparatus(es), system(s), device(s), and/or the like, to perform one or more of the operations as depicted and described. For purposes of simplifying the description, the method 1200 is described as performed by and from the perspective of the operation and escalation management server 210. In this regard, performance of the operations may invoke one or more of memory 201, processor 202, input/output circuitry 203, communications circuitry 204, and/or network environment operation and escalation circuitry 205.

In the embodiment illustrated in FIG. 12, the flowchart illustrates method 1200 which begins at block 1202. At block 1202, the operation and escalation management server

210 includes means, such as the memory 201, processor 202, input/output circuitry 203, communications circuitry 204, and/or network environment operation and escalation circuitry 205, or a combination thereof, to generate a non-software development network environment event data interface component. In some embodiments, the non-software development network environment event data interface component may be generated based at least in part on a portion of the non-software development network environment escalate action data. In some embodiments, the operation and escalation management server 210 may access the non-software development network environment escalate action data from the non-software development network environment data repository 220 (e.g., the non-software development network environment escalate action data is retrieved from the non-software development network environment data repository 220).

At block 1204, the operation and escalation management server 210 includes means, such as the memory 201, processor 202, input/output circuitry 203, communications circuitry 204, and/or network environment operation and escalation circuitry 205, or a combination thereof, to generate a non-software development network environment escalate trigger interface component configured to capture a non-software development network environment escalate trigger event.

At block 1206, the operation and escalation management server 210 includes means, such as the memory 201, processor 202, input/output circuitry 203, communications circuitry 204, and/or network environment operation and escalation circuitry 205, or a combination thereof, to output the non-software development network environment event data interface component and the non-software development network environment escalate trigger interface component for rendering to a non-software development network environment interface of a computing device associated with the non-software development network environment escalate trigger interface component.

FIGS. 9, 10, 11, and 12 thus illustrate flowcharts describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 201 of the operation and escalation management server 210 and executed by a processor 202 of the operation and escalation management server 210. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of the present disclosure or of what may be claimed, but rather as description of features specific to particular embodiments of the present disclosure. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus for outputting a software development network environment escalate action aggregation interface component to a software development network environment operations action interface, the apparatus comprising at least one processor, and at least one memory including program code, the at least one memory and the program code configured to, with the at least one processor, cause the apparatus to at least:

access non-software development network environment escalate action data;

determine a non-software development network environment escalate action characteristic set based at least in part on the non-software development network environment escalate action data, the non-software development network environment escalate action characteristic set indicative of at least one non-software development network environment escalate action item;

generate a software development network environment escalate action aggregation interface component comprising the non-software development network environment escalate action item;

output the software development network environment escalate action aggregation interface component for rendering to a software development network environment operations action interface of a computing device associated with the software development network environment escalate action aggregation interface component;

generate a non-software development network environment event data interface component based at least in part on a portion of the non-software development network environment escalate action data;

generate a non-software development network environment escalate trigger interface component configured to capture a non-software development network environment escalate trigger event, and output the non-software development network environment event data interface component and the non-software development network environment escalate trigger interface component for rendering to a non-software development network environment interface of a computing device associated with the non-software development network environment escalate trigger interface component.

2. The apparatus of claim 1, wherein the program code is further configured to, with the at least one processor, cause the apparatus to:

access software development network environment operations data;

determine a software development network environment operations characteristic set based at least in part on the software development network environment operations data, the software development network environment operations characteristic set indicative of at least one software development network environment operations item;

generate a software development network environment operations data interface component comprising the software development network environment operations item; and output the software development network environment operations data interface component for rendering to the software development network environment operations action interface of the computing device.

3. The apparatus of claim 2, wherein the software development network environment escalate action aggregation interface component is rendered proximate the software development network environment operations data interface component on the software development network environment operations action interface of the computing device.

4. The apparatus of claim 1, wherein determining the non-software development network environment escalate action characteristic set is based at least in part on an escalate action characteristic model.

5. The apparatus of claim 4, wherein the escalate action characteristic model is a trained machine learning model.

6. The apparatus of claim 5, wherein the escalate action characteristic model is trained using historical non-software development network environment escalate action characteristic sets.

7. The apparatus of claim 1, wherein the non-software development network environment escalate action characteristic set comprises one or more of a key identifier, an item nature indication, a component identifier, a service identifier, a network environment user identifier, or an action status.

8. The apparatus of claim 1, wherein the program code is further configured to, with the at least one processor, cause the apparatus to:

modify a software development network environment access permission associated with the non-software development network environment escalate action item.

9. The apparatus of claim 8, wherein modifying the software development network environment access permission is based at least in part on the non-software development network environment escalate trigger event.

10. A method for outputting a software development network environment escalate action aggregation interface component to a software development network environment operations action interface, the method comprising:

accessing non-software development network environment escalate action data;

determining a non-software development network environment escalate action characteristic set based at least in part on the non-software development network environment escalate action data, the non-software development network environment escalate action characteristic set indicative of at least one non-software development network environment escalate action item;

generating a software development network environment escalate action aggregation interface component comprising the non-software development network environment escalate action item;

outputting the software development network environment escalate action aggregation interface component for rendering to a software development network environment operations action interface of a computing device associated with the software development network environment escalate action aggregation interface component;

generating a non-software development network environment event data interface component based at least in part on a portion of the non-software development network environment escalate action data;

generating a non-software development network environment escalate trigger interface component configured to capture a non-software development network environment escalate trigger event; and outputting the non-software development network environment event data interface component and the non-software development network environment escalate trigger interface component for rendering to a non-software development network environment interface of a computing device associated with the non-software development network environment escalate trigger interface component.

11. The method of claim 10, further comprising:

accessing software development network environment operations data;

determining a software development network environment operations characteristic set based at least in part on the software development network environment operations data, the software development network environment operations characteristic set indicative of at least one software development network environment operations item;

generating a software development network environment operations data interface component comprising the software development network environment operations item; and outputting the software development network environment operations data interface component for rendering to the software development network environment operations action interface of the computing device.

12. The method of claim 11, wherein the software development network environment escalate action aggregation interface component is rendered proximate the software development network environment operations data interface component on the software development network environment operations action interface of the computing device.

13. The method of claim 10, wherein determining the non-software development network environment escalate action characteristic set is based at least in part on an escalate action characteristic model.

14. The method of claim 13, wherein the escalate action characteristic model is a trained machine learning model, wherein the escalate action characteristic model is trained using historical non-software development network environment escalate action characteristic sets.

15. The method of claim 10, wherein the non-software development network environment escalate action characteristic set comprises one or more of a key identifier, an item nature indication, a component identifier, a service identifier, a network environment user identifier, or an action status.

16. The method of claim 10, further comprising:

modifying a software development network environment access permission associated with the non-software development network environment escalate action item.

17. The method of claim 16, wherein modifying the software development network environment access permission is based at least in part on the non-software development network environment escalate trigger event.

18. A computer program product for outputting a software development network environment escalate action aggregation interface component to a software development network environment operations action interface, the computer program product comprising at least one non-transitory computer-readable storage medium having computer-readable program code portions stored therein, the computer-readable program code portions comprising an executable portion configured to:

access non-software development network environment escalate action data;

determine a non-software development network environment escalate action characteristic set based at least in part on the non-software development network environment escalate action data, the non-software development network environment escalate action characteristic set indicative of at least one non-software development network environment escalate action item;

generate a software development network environment escalate action aggregation interface component comprising the non-software development network environment escalate action item;

output the software development network environment escalate action aggregation interface component for rendering to a software development network environment operations action interface of a computing device associated with the software development network environment escalate action aggregation interface component;

generate a non-software development network environment event data interface component based at least in part on a portion of the non-software development network environment escalate action data, generate a non-software development network environment escalate trigger interface component configured to capture a non-software development network environment escalate trigger event; and output the non-software development network environment event data interface component and the non-software development network environment escalate trigger interface component for rendering to a non-software development network environment interface of a computing device associated with the non-software development network environment escalate trigger interface component.

* * * * *